(12) United States Patent
Redmann

(10) Patent No.: US 10,924,582 B2
(45) Date of Patent: Feb. 16, 2021

(54) DISTRIBUTED CONTROL OF SYNCHRONIZED CONTENT

(75) Inventor: William Gibbens Redmann, Glendale, CA (US)

(73) Assignee: INTERDIGITAL MADISON PATENT HOLDINGS, Paris (FR)

( * ) Notice: Subject to any disclaimer, the term of this patent is extended or adjusted under 35 U.S.C. 154(b) by 628 days.

(21) Appl. No.: 14/376,632

(22) PCT Filed: Aug. 9, 2012

(86) PCT No.: PCT/US2012/050130
§ 371 (c)(1),
(2), (4) Date: Aug. 5, 2014

(87) PCT Pub. No.: WO2013/133863
PCT Pub. Date: Sep. 12, 2013

(65) Prior Publication Data
US 2015/0019670 A1    Jan. 15, 2015

Related U.S. Application Data

(60) Provisional application No. 61/609,040, filed on Mar. 9, 2012.

(51) Int. Cl.
| | |
|---|---|
| *H04L 29/08* | (2006.01) |
| *H04N 21/242* | (2011.01) |
| *H04L 29/06* | (2006.01) |
| *H04N 21/4788* | (2011.01) |

(52) U.S. Cl.
CPC ........ *H04L 67/322* (2013.01); *H04L 65/4092* (2013.01); *H04L 67/16* (2013.01); *H04N 21/242* (2013.01); *H04N 21/4788* (2013.01)

(58) Field of Classification Search
None
See application file for complete search history.

(56) References Cited

U.S. PATENT DOCUMENTS 5,548,324 A    8/1996 Downs et al.
5,808,662 A    9/1998 Kinney et al.
(Continued)

FOREIGN PATENT DOCUMENTS

| CN | 101502111 | 8/2009 |
|---|---|---|
| EP | 1126709 | 8/2001 |
(Continued)

OTHER PUBLICATIONS

"Syncplay client source code", GitHub.com, Feb. 18, 2012 [retrieved on Oct. 27, 2016]. Retrieved from the Internet: <URL:https://github.com/fluxid/syncplay/blob/master/syncplay/client.py>.*
(Continued)

*Primary Examiner* — Sm A Rahman
*Assistant Examiner* — Dae Kim
(74) *Attorney, Agent, or Firm* — Meagher Emanuel Laks Goldberg & Liao, LLP.

(57) ABSTRACT

A method for processing a transport command at a local content controller to control the playback of shared content in synchrony with other, remote content controllers commences by first determining whether a received transport command originated from the local content controller or from at least one remote content controller. In the event of a locally originated transport command, the local content controller will prioritize the locally originated transport command with recently received transport commands. Thereafter, the local controller will transmit the locally originated transport command to at least one remote content controller for execution thereby if the locally originated transport command has priority. In the event of a remotely originated transport command, the local controller will prioritize the remotely originated transport command with recently received transport commands and then execute the prioritized transport commands in accordance with the latency between content controllers.

11 Claims, 15 Drawing Sheets

(56) References Cited

U.S. PATENT DOCUMENTS

| | | | |
|---|---|---|---|
| 5,896,128 | A | 4/1999 | Boyer et al. |
| 6,653,545 | B2 | 11/2003 | Redmann et al. |
| 6,754,904 | B1 | 6/2004 | Cooper et al. |
| 6,894,714 | B2 | 5/2005 | Gutta et al. |
| 7,076,447 | B1 | 7/2006 | Peyser et al. |
| 7,146,330 | B1 | 12/2006 | Alon et al. |
| 7,236,615 | B2 | 6/2007 | Miller et al. |
| 7,318,051 | B2 | 1/2008 | Weston et al. |
| 7,518,051 | B2 | 4/2009 | Redmann et al. |
| 7,528,860 | B2 | 5/2009 | Harville et al. |
| 7,600,247 | B2 | 10/2009 | Onomatsu |
| 7,620,206 | B2 | 11/2009 | Ohba |
| 7,669,219 | B2 | 2/2010 | Scott, III |
| 7,817,180 | B2 | 10/2010 | Jeong et al. |
| 7,818,770 | B2 | 10/2010 | Ducheneaut et al. |
| 7,849,145 | B2 | 12/2010 | Kang et al. |
| 7,865,834 | B1 | 1/2011 | Van Os et al. |
| 7,873,983 | B2 | 1/2011 | Ducheneaut et al. |
| 7,882,530 | B2 | 2/2011 | Ducheneaut et al. |
| 7,921,156 | B1 | 4/2011 | Stolorz et al. |
| 7,970,661 | B1 | 6/2011 | Abraham et al. |
| 8,060,525 | B2 | 11/2011 | Svendsen et al. |
| 8,126,268 | B2 | 2/2012 | Rossato et al. |
| 8,271,334 | B1 | 9/2012 | Funk et al. |
| 8,417,535 | B2 | 4/2013 | Kusumoto et al. |
| 8,527,334 | B2 | 9/2013 | Porter et al. |
| 8,606,634 | B2 | 12/2013 | Porter et al. |
| 8,677,282 | B2 | 3/2014 | Cragun et al. |
| 8,830,293 | B2 | 9/2014 | Mauchly et al. |
| 8,957,918 | B2 | 2/2015 | Godavari |
| 9,490,998 | B1 * | 11/2016 | Danciu ............... H04L 12/2818 |
| 2002/0099774 | A1 | 7/2002 | Yamato et al. |
| 2002/0138831 | A1 | 9/2002 | Wachtfogel et al. |
| 2004/0003413 | A1 | 1/2004 | Boston et al. |
| 2004/0015999 | A1 | 1/2004 | Carlucci |
| 2004/0054577 | A1 | 3/2004 | Inoue |
| 2004/0080611 | A1 | 4/2004 | Kakii et al. |
| 2004/0194131 | A1 | 9/2004 | Ellis |
| 2005/0091311 | A1 * | 4/2005 | Lund ................ G08B 13/19656 709/203 |
| 2005/0227614 | A1 | 10/2005 | Hosking et al. |
| 2005/0286466 | A1 * | 12/2005 | Tagg ................... H04L 12/2856 370/329 |
| 2006/0013557 | A1 | 1/2006 | Poslinski |
| 2006/0085824 | A1 * | 4/2006 | Bruck ................ H04N 7/17336 725/86 |
| 2006/0101062 | A1 * | 5/2006 | Godman ................ G06F 9/5038 |
| 2006/0136960 | A1 | 6/2006 | Morris |
| 2006/0161835 | A1 | 7/2006 | Panabaker et al. |
| 2006/0174312 | A1 | 8/2006 | Ducheneaut et al. |
| 2006/0190966 | A1 | 8/2006 | McKissick et al. |
| 2006/0218577 | A1 | 9/2006 | Goodman et al. |
| 2006/0236352 | A1 | 10/2006 | Scott, III |
| 2006/0282856 | A1 | 12/2006 | Errico et al. |
| 2007/0022375 | A1 | 1/2007 | Walker |
| 2007/0039449 | A1 * | 2/2007 | Redmann ............... G10H 1/0058 84/609 |
| 2007/0055566 | A1 | 3/2007 | Gaughan |
| 2007/0156520 | A1 | 7/2007 | Sharma |
| 2007/0157114 | A1 | 7/2007 | Bishop |
| 2007/0266400 | A1 | 11/2007 | Rogers et al. |
| 2008/0103879 | A1 | 5/2008 | Armstrong |
| 2008/0133647 | A1 | 6/2008 | Hamzeh |
| 2008/0168505 | A1 | 7/2008 | Saito et al. |
| 2008/0249961 | A1 | 10/2008 | Harkness et al. |
| 2008/0266380 | A1 | 10/2008 | Gorzynski et al. |
| 2008/0307412 | A1 | 12/2008 | Marr et al. |
| 2009/0024718 | A1 | 1/2009 | Anagnostopoulos |
| 2009/0030774 | A1 | 1/2009 | Rothschild et al. |
| 2009/0033737 | A1 | 2/2009 | Goose et al. |
| 2009/0109278 | A1 | 4/2009 | Karnalkar et al. |
| 2009/0132356 | A1 | 5/2009 | Booth et al. |
| 2009/0132383 | A1 | 5/2009 | Piepenbrink et al. |
| 2009/0133069 | A1 | 5/2009 | Conness |
| 2009/0169171 | A1 | 7/2009 | Massey et al. |
| 2009/0215538 | A1 | 8/2009 | Jew |
| 2009/0232285 | A1 | 9/2009 | Mani |
| 2009/0240771 | A1 | 9/2009 | Capobianco |
| 2009/0251599 | A1 | 10/2009 | Kashyap et al. |
| 2009/0293079 | A1 | 11/2009 | McKee et al. |
| 2009/0307047 | A1 | 12/2009 | Cook et al. |
| 2009/0315974 | A1 | 12/2009 | Matthews |
| 2009/0328122 | A1 | 12/2009 | Amento et al. |
| 2010/0030648 | A1 | 2/2010 | Manolescu et al. |
| 2010/0043020 | A1 | 2/2010 | Basso |
| 2010/0066804 | A1 | 3/2010 | Shoemake et al. |
| 2010/0082727 | A1 | 4/2010 | Zalewski |
| 2010/0100923 | A1 | 4/2010 | Toiyama |
| 2010/0085416 | A1 | 5/2010 | Hegde et al. |
| 2010/0114692 | A1 | 5/2010 | Steelberg et al. |
| 2010/0122304 | A1 * | 5/2010 | Scott, III ................ H04N 5/76 725/89 |
| 2010/0131385 | A1 | 5/2010 | Harrang et al. |
| 2010/0146133 | A1 | 6/2010 | Perrin et al. |
| 2010/0153577 | A1 * | 6/2010 | Wohlert ............. H04N 7/17318 709/231 |
| 2010/0171807 | A1 | 7/2010 | Tysso |
| 2010/0171848 | A1 | 7/2010 | Peters et al. |
| 2010/0199310 | A1 | 8/2010 | Newell |
| 2010/0223119 | A1 | 9/2010 | Klish |
| 2010/0302446 | A1 | 12/2010 | Mauchly et al. |
| 2010/0318405 | A1 | 12/2010 | Kirby |
| 2011/0040634 | A1 | 2/2011 | Landsberry et al. |
| 2011/0050995 | A1 | 3/2011 | Ozawa et al. |
| 2011/0090302 | A1 | 4/2011 | Leviav et al. |
| 2011/0131616 | A1 | 6/2011 | Cho |
| 2011/0138018 | A1 | 6/2011 | Raveendran et al. |
| 2011/0145881 | A1 | 6/2011 | Hartman et al. |
| 2011/0154386 | A1 | 6/2011 | Cochinwala et al. |
| 2011/0154417 | A1 | 6/2011 | Civanlar et al. |
| 2011/0173672 | A1 | 7/2011 | Angiolillo et al. |
| 2011/0191288 | A1 | 8/2011 | Spears |
| 2011/0218656 | A1 | 9/2011 | Bishop et al. |
| 2011/0219405 | A1 | 9/2011 | McRae |
| 2011/0261142 | A1 | 10/2011 | Shanmukhadas et al. |
| 2011/0264532 | A1 | 10/2011 | Chan et al. |
| 2011/0316853 | A1 | 12/2011 | Bar-Zeev et al. |
| 2012/0026277 | A1 | 2/2012 | Malzbender et al. |
| 2012/0038742 | A1 | 2/2012 | Robinson et al. |
| 2012/0054278 | A1 | 3/2012 | Taleb et al. |
| 2012/0084160 | A1 | 4/2012 | Badros et al. |
| 2012/0166349 | A1 | 6/2012 | Dedis |
| 2012/0229588 | A1 * | 9/2012 | Greenfield ....... H04N 21/25883 348/14.04 |
| 2012/0239506 | A1 | 9/2012 | Sanders |
| 2012/0257112 | A1 | 10/2012 | Fritsch |
| 2012/0314077 | A1 | 12/2012 | Clavenna, II et al. |
| 2013/0030987 | A1 | 1/2013 | Zuckerberg |
| 2013/0076980 | A1 | 3/2013 | Oren et al. |
| 2013/0125153 | A1 | 5/2013 | Hilson et al. |
| 2013/0173742 | A1 * | 7/2013 | Thomas .............. H04L 65/4076 709/217 |
| 2013/0211971 | A1 | 8/2013 | Lin et al. |
| 2013/0212610 | A1 | 8/2013 | Hussain et al. |
| 2013/0246155 | A1 | 9/2013 | Kandanala et al. |
| 2013/0282454 | A1 | 10/2013 | Alpert et al. |
| 2013/0290098 | A1 | 10/2013 | Steelberg |
| 2013/0303591 | A1 | 11/2013 | Brown et al. |
| 2013/0304582 | A1 | 11/2013 | Beasley |
| 2013/0347033 | A1 | 12/2013 | Grab |
| 2014/0139620 | A1 | 5/2014 | Redmann et al. |
| 2014/0215535 | A1 | 7/2014 | Elliott et al. |
| 2015/0019670 | A1 | 1/2015 | Redmann |
| 2015/0074716 | A1 | 3/2015 | Redmann |
| 2015/0089372 | A1 | 3/2015 | Mandalia et al. |
| 2015/0095931 | A1 | 4/2015 | Duong et al. |
| 2015/0199727 | A1 | 7/2015 | Naveh |
| 2015/0256584 | A1 | 9/2015 | Sakaguchi et al. |
| 2016/0014371 | A1 | 1/2016 | Huber et al. |

FOREIGN PATENT DOCUMENTS

| | | |
|---|---|---|
| EP | 2202970 | 6/2010 |
| JP | 1997282133 | 10/1997 |
| JP | 2002218277 | 8/2002 |
| JP | 2003163911 | 6/2003 |
| JP | 2004135062 | 4/2004 |
| JP | 2006041885 | 4/2006 |
| JP | 2006108947 | 4/2006 |
| JP | 2006345121 | 12/2006 |
| JP | 2008539611 | 11/2008 |
| JP | 2010206349 | 9/2010 |
| JP | 2011114870 | 6/2011 |
| KR | 20030023415 | 3/2003 |
| KR | 747699 B1 | 8/2007 |
| KR | 812903 | 3/2008 |
| KR | 939904 | 2/2010 |
| KR | 20110125548 | 11/2011 |
| WO | WO2004/032507 | 4/2004 |
| WO | WO2004032507 | 4/2004 |
| WO | 2011/162476 A1 | 12/2011 |
| WO | WO2012008972 | 1/2012 |
| WO | WO2012162721 | 12/2012 |
| WO | WO2013019259 | 2/2013 |
| WO | WO2013103583 | 7/2013 |
| WO | 2013/133863 A1 | 9/2013 |
| WO | 2013/165341 A2 | 11/2013 |
| WO | 2014/055058 A1 | 4/2014 |
| WO | 2014/066290 A1 | 5/2014 |
| WO | 2014/168616 A1 | 10/2014 |
| WO | 2014/175876 A1 | 10/2014 |

OTHER PUBLICATIONS

Goderbauer, et al. "Syncro—Concurrent Editing Library for Google Wave", Int'l Conference on Web Engineering (ICWE) 2010, vol. 6189, 2010, pp. 510-513 [retrieved on Mar. 10, 2017]. Retrieved from SpringerLink. DOI: 10.1007/978-3-642-13911-6_40.*

Bernstein et al. "Concurrency Control in Distributed Database Systems", Computing Surveys, vol. 13, No. 2, Jun. 1981, pp. 185-221 [retrieved on Feb. 3, 2019]. Retrieved from the Internet: <URL: https://people.eecs.berkeley.edu/~brewer/cs262/concurrency-distributed-databases.pdf>. (Year: 1981).*

Boronat et al., "Smooth Control of Adaptive Media Playout to Acquire IDMS in Cluster-based Applications," 36th Annual IEEE Conf. on Local Computer Networks, LCN 2011, Bonn, 2011 IEEE, pp. 613-621.

Fan et al., "Learning to Predict Ad Clicks Based on Boosted Collaborative Filtering," IEEE Int'l. Conf. on Social Computing/IEEE Int'l. Conf. on Privacy, Security, Risk and Trust, 2010 IEEE, pp. 209-216.

Han et al., "Four-way Video Conference in Home Server for Digital Home," 2006 IEEE, 6 pages.

Ishikawa et al., "The design of a set-top box with video encoder and its application to video conferencing," EUROPTO Symposium on Broadband European Networks, Zurich, Switzerland, May 1998, SPIE vol. 3408, pp. 592-602.

Pan et al., "Real-Time Collaborative Video Watching on Mobile Devices with REST Services," 2012 Third FTRA Int'l. Conference on Mobile, Ubiquitous, and Intelligent Computing, 2012 IEEE, pp. 29-34.

Levent-Levi, "What Layouts Should a Dual Video System Support? VoIP Survivor," http://blog.radvision.com/voipsurvivor/2009/12/07/what-layouts-should, Dec. 7, 2009, 3 pages.

Zarros et al: "Interparticipant Synchronization in Real-Time Multimedia Conferencing Using Feedback"; IEEE ACM Transaction On Networking, NY, NY Apr. 1, 1996, vol. 4, # 2, pp. 173-180.

International Search Report dated Feb. 21, 2013.

Sen-Ching S. Cheung and Chandrika Kamath: "Robust techniques for background subtraction in urban traffic video", Proc. SPIE 5308, Visual Communications and Image Processing 2004, (Jan. 18, 2004); https://doi.org/10.1117/12.526886.

English translation of CN101502111.
English translation of JP2006345121.
English translation of JP2006041885.

* cited by examiner

Button event at time T with transport at position P:

| State: | PAUSE | PLAY | FF | ~FF | RW | ~RW | SK+ | SK- | TIME OUT |
|---|---|---|---|---|---|---|---|---|---|
| 201 PAUSED | 231 — | PLAYPENDING from P @T+x | FF from P @ speed S | 227 — | RW from P @ speed S | 225 / 223 | PAUSE to P+d | PAUSE to P-d / 221 | — |
| 213 FF white PAUSED | — | — | 228 — | PAUSE to P | — | — | — | — | — |
| 212 RW white PAUSED | — | — | — | — | 226 — | PAUSE to P | — | — | — |
| 202 PLAYPENDING | 232 PAUSE to P | 247 — | FF from P @ speed S | — | RW from P @ speed S | 245 / 243 | PLAYPENDING from P+d @T+x / 241 | PLAYPENDING from P-d @T+x | PLAY to P |
| 203 PLAYING | 252 PAUSE to P | 304 — | FF from P @ speed S | 267 — | RW from P @ speed S | 265 / 263 | PLAYPENDING from P+d @T+x / 261 | PLAYPENDING from P-d @T+x / 261 | — |
| 217 FF white PLAYING | — | — | 248 — | PLAYPENDING from P @T+x | — | — | — | — | — |
| 216 RW white PLAYING | — | — | — | — | 246 — | PLAYPENDING from P @T+x | — | — | — |

FIG. 3

DISTRIBUTED CONTROL OF SYNCHRONIZED CONTENT

CROSS-REFERENCE TO RELATED APPLICATIONS

This application is a National Stage Application and claims the benefit, under 35 U.S.C. § 365 of International Application PCT/US2012/050130 filed Aug. 9, 2012 which was published in accordance with PCT Article 21(2) on Jul. 12, 2012 in English and which claims the benefit of U.S. Provisional Patent Application No. 61/609,040 filed Mar. 9, 2012.

TECHNICAL FIELD

This invention relates to a technique for controlling the playback of shared content among a plurality of participants at different locations.

BACKGROUND ART

Various known techniques allow the control of a plurality of content controllers (also called "media controllers") so that they collectively operate as a distributed content controller, also called a "distributed transport." Such techniques for confederation of content controllers allows individual content controllers at each of a plurality of stations (generally at different locations) to share information and commands so as to, through their coordinated actions, provide substantially simultaneous playback of audio and/or video content at all participating stations. Such techniques allow participants at the various locations to execute different content controller commands, also called "transport commands" (e.g., pause, rewind, fast-forward, and play) while maintaining each participating site at substantially the same status at substantially the same point in the "shared content." In other words, the audio or video content presented using the distributed content controller appears at each station to be in substantially the same state (e.g., playing, paused, fast-forwarding) at substantially the same position in the content, regardless of intervening transport commands. (The noun "transport" as used herein relates to digital content controllers and comes by way of analogy to the mechanical "tape transport" used to move magnetic tape past the read and write heads in a tape recorder.) Thus, "shared content" does not dependent upon how each station actually obtains the content, but rather describes that the content viewing experience at one participating station using one of the content controllers of is substantially the same as for those at any of the other participating stations.

While different viewers watching a video broadcast would be seeing the same content at the same state and position, this would not be "shared content" in the sense that if one viewer were to pause the playout, e.g., using their own digital video recorder (DVR), their view of the video would pause, but the video as seen by all the other viewers would continue. The content is the same, but the lack of consistency of status and position throughout some plurality of stations would not qualify such a broadcast as "shared content." In a different scenario, where such a broadcast is watched by a plurality of participants using a DVR that is confederating to form a distributed content controller, then that broadcast would be "shared content" for those viewers, since if one viewer were to pause or rewind the content on their DVR, all the participating DVRs would follow suit.

Even so, there are drawbacks to existing distributed content controllers. In some systems, control of the distributed content controller is limited to a designated participant; much like a studio engineer controls the recording and playback equipment, while band members do not. In other systems, the participants at the various locations have equal capability to control playout of the shared content, for example to rewind to re-hear a marginally intelligible phrase. However, a race condition can result when two or more participants issue commands within short intervals of each other, resulting in multiple commands of an additive or conflicting nature. The execution of such multiple commands can yield unexpected, if not undesirable results.

In present systems that allow any participant to issue commands to the distributed content controller, their inability to identify the issuer of a transport command can also cause a problem. Presently, only the issuer of a transport command has knowledge of the issuance of the command. If multiple participants simultaneously issue commands without knowledge of who issued such commands, the individual participants will likely become perplexed and issue one or more additional commands, further confusing the situation.

U.S. Pat. No. 6,653,545 (Redmann et al.) and U.S. Pat. No. 7,518,051 (Redmann), teach a distributed transport control scheme suitable for use in collaborative music recording. Such distributed transport control strategies would likely prove unsuitable for use in a social television application because the ability to command the distributed content controller is constrained to one designated participant. U.S. Pat. No. 7,818,770 (Ducheneaut et al.), U.S. Pat. No. 7,873,983 (also Ducheneaut et al), and U.S. Patent Application 2011/0218656 (Bishop et al.) each teach one or more methods for keeping multiple stations synchronized in their playout of shared content, even as individual stations issued commands to their corresponding content controllers. However, these techniques suffer from the drawbacks mentioned above, or in some cases avoid certain issues by dropping stations not sufficiently in synchronization. Thus, a need exists for an improved technique for controlling the playback of shared content among a plurality of audience members at different locations.

BRIEF SUMMARY OF THE INVENTION

Briefly, in accordance with a preferred embodiment, a method for processing a transport command at a local content controller to control the playback of shared content commences by first determining whether a received transport command originated from the local content controller or from at least one remote content controller. In the event of a locally originated transport command, the local content controller will prioritize the locally originated transport command with yet unexecuted transport commands. Thereafter, the local controller will transmit the locally originated transport command to at least one remote content controller for execution thereby if the locally originated transport command has priority. In the event of a remotely originated transport command, the local controller will prioritize the remotely originated transport command with yet unexecuted transport command and then execute the prioritized transport commands in accordance with the latency between content controllers.

BRIEF SUMMARY OF THE DRAWINGS

FIG. 3 depicts an exemplary transition table for implementing the content controller state transitions depicted in FIG. 2;

DETAILED DESCRIPTION

Figure 1:
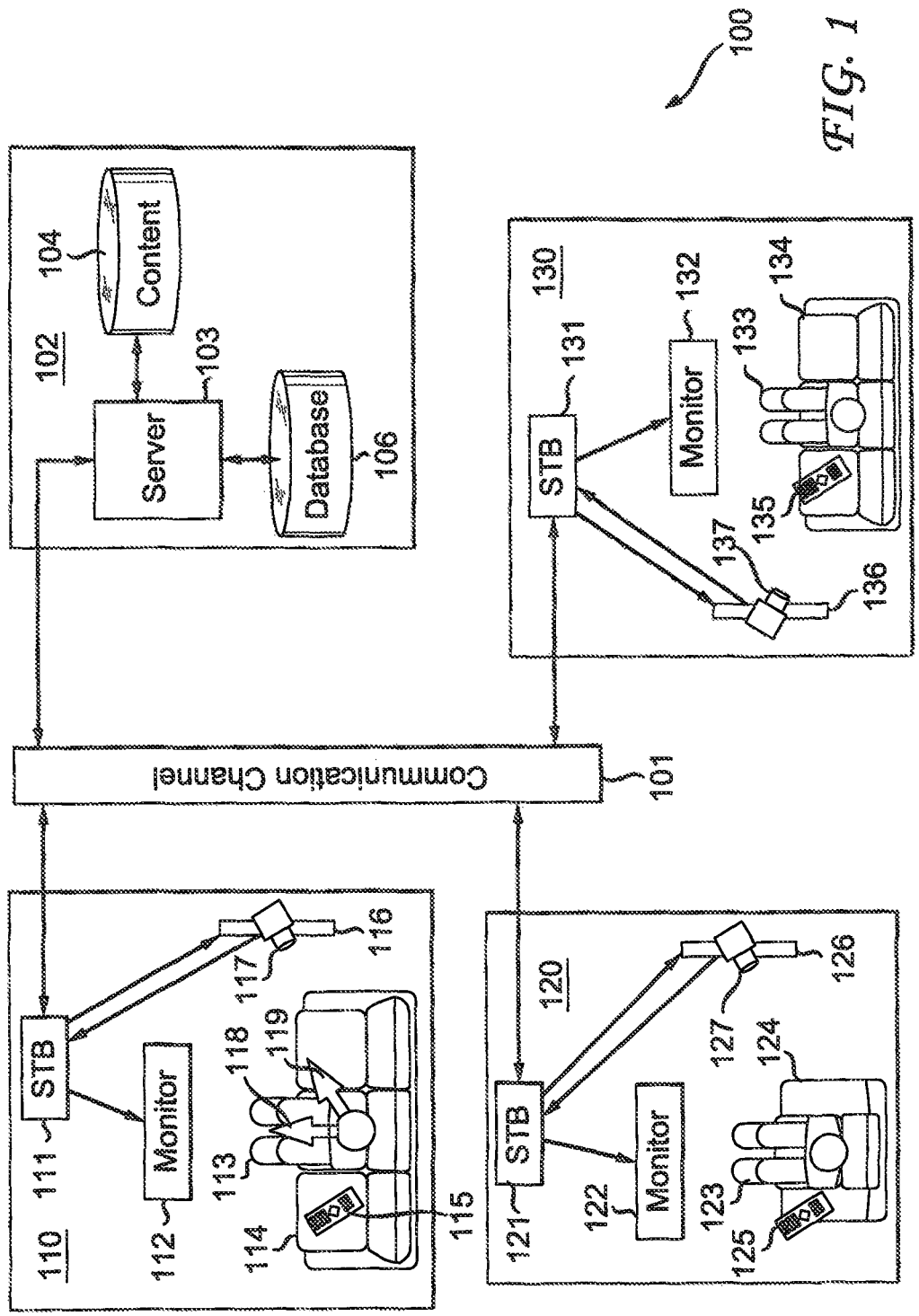
FIG. 1 depicts an exemplary block diagram of a distributed content controller for use by participants in a distributed audience to view shared content, with telepresence features.

FIG. 1 depicts a block schematic diagram of a shared content system 100 that makes use of a common communications channel 101 to link a plurality of stations, for example stations 110, 120, and 130, to each other and to a head end 102. In the embodiment shown, stations 110, 120, and 130 include features suitable for providing telepresence among the stations using monitors and cameras (as shown) provided for that purpose. In this way, the stations 110, 120, and 130 can communicate with each other as well as download content from the head 102 for individual consumption as well as for sharing with one or more other stations as shared content. The content downloaded from head end 102 can include audio-visual files, such as movies, television programs, games, advertisements, or the like. While FIG. 1 depicts three stations 110, 120 and 130, a larger or smaller number of stations could exist without departing from the present principles.

Each of the stations 110, 120, and 130 comprises a separate one of content monitors 112, 122, and 132, respectively, for viewing by a corresponding one of participants 113, 123, and 133, respectively. The participants 113, 123 and 133 watch their content monitors 112, 122, and 132, respectively, from couches or chairs 114, 124, and 134, respectively. In the illustrated embodiment of FIG. 1, each of the stations 110, 120, and 130 includes a separate one of set-top boxes (STBs) 111, 121, and 131, respectively, for tuning content from the head end 102 and for driving a corresponding one of the content monitors 112, 122, and 132, respectively. The stations 110, 120, and 130 also include telepresence monitors 116, 126, and 136, respectively, and collocated telepresence cameras 117, 127, and 137, respectively, each coupled to a separate one of the STBs 111, 121, and 131, respectively. In practice, the telepresence monitors 116, 126, and 136 lie to one side of the content monitors 112, 122, and 132, respectively. As an example, the content monitor 112 lies aligned directly with the participant 112 so that the participant 113 looks in a direction 118 (e.g., straight ahead) to watch the shared content. However, the participant 113 will turn in a different direction 119 (e.g., at angle) to view the telepresence monitor 116 to view images of participants 123 and 133 captured by a separate one of the remote telepresence cameras 127 and 137, respectively.

For ease of discussion, the participant resident at an associated one of the stations 110, 120, and 130 bears the designation "local participant." From the perspective of each local participant, each participant at another station becomes a "remote participant." Thus, from the perspective of the participant 113 at the station 110, the participants 123 and 133 at the stations 120 and 130, respectively, become remote participants.

Although not shown in FIG. 1, one or more of the telepresence cameras 117, 127, and 137 can lie collocated with the screen of a corresponding one of the content monitors 112, 122, and 132, respectively. For such a case, the image of each remote participant could appear in a picture-in-picture mode on the local participant's content monitor. For example, the participant 113 could view the image of each of the remote participants 123 and 133 on his or her content monitor 112. Displaying the image of the remote participant(s) on the content monitor of a local participant thus obviates the need to provide each local participant with a separate telepresence monitor.

Each of the set-top boxes 111, 121, and 131 has an associated one of remote control units 115, 125 and 135, respectively. In practice each of the participants 113, 123, and 133 will actuate a corresponding one of the remote controls 115, 125, and 135, respectively, to control the tuning by their respective STB of content from the head end 102 and the playout of such on the content monitors 112, 122, and 132. In this way, each of the participants 112, 123, and 133 thus can control the playout of content on his or her content monitor. During a shared content session with one or more remote participants, a local participant can also control the playout of content at the corresponding one or more remote stations.

In practice, the content tuned from the head end 102 originates from one or more sources, including, but not limited to, over-the-air television broadcasters, satellite television providers, and/or cable television providers. Further, the content tuned by each of STB 111, 121, and 131 could originate from a VCR, a DVD player, a Personal Video Recorder, a personal computer or a local gateway, for example. In some instances, separate copies of the shared content could exist at each of the stations 110, 120 and 130, respectively, (e.g., separate DVD players connected to the STBs 111, 121 and 131). In other instances, a program available to one STB (e.g., the STB 111) might undergo streaming to the other two STBs 121 and 131), rather than requiring local copies of the content at each station.

For the discussion that follows, assume that the head-end 102 serves as the source for the content for viewing substantially simultaneously and in substantial synchronization (as defined hereinafter) on each of the shared content monitors 112, 122, and 132. In practice, the shared content includes images (e.g., video) as well as accompanying audio presented in synchronization with the video. For ease of illustration, FIG. 1 does not illustrate audio reproduction devices (e.g., speakers) necessary for audio playout, but such devices would typically exist at each of the stations 110, 120, and 130.

The head-end 102 comprises at least one storage device 104 storing content for delivery by a server 103 to the STBs 111, 121, and 131 through the communication channel 101. The server 103 can also include a database 106 for authenticating the participants 113, 123, and 133 or the STBs 111, 121, and 131 for various purposes, including:

(a) determining eligibility for downloading certain content from the storage device 104;
(b) maintaining an electronic program guide or index of content available in storage device 104; and
(c) maintaining a list of friends for each of participant 113, 123, and 133 to facilitate viewing of shared content.

Figure 2:
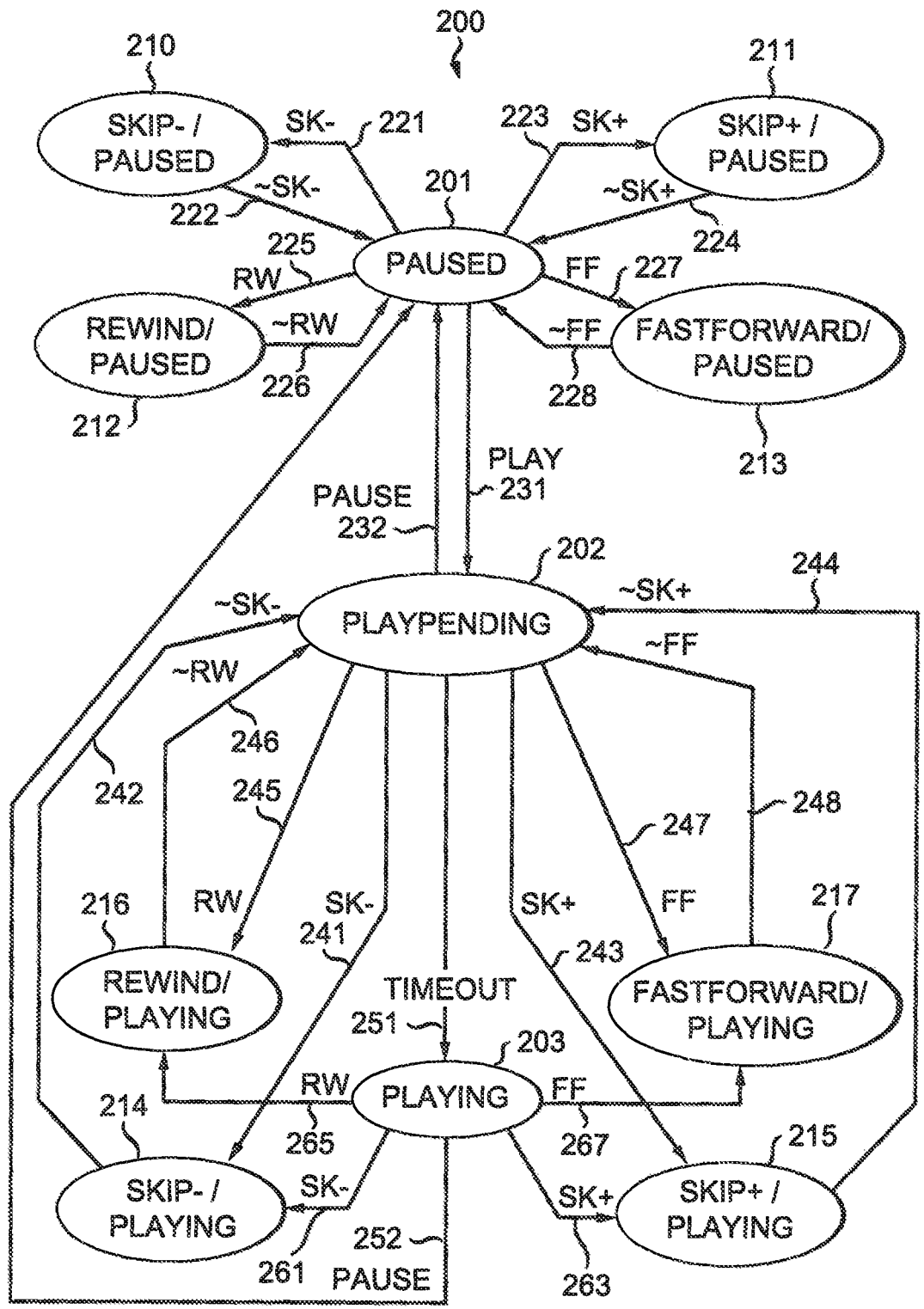
FIG. 2 depicts an exemplary state transition diagram depicting transitions between content controller states induced by content controller commands (i.e., "transport commands") for shared content playback within the distributed content controller of FIG. 1.

FIG. 2 shows an exemplary state transition diagram 200 for the content controllers implemented by the STBs 111, 121, and 131 of FIG. 1 cooperating as a distributed content controller, so that content viewed on the content monitors 112, 122, and 132 remains substantially synchronized at each of stations 110, 120, and 130, respectively, and thereby providing "shared content" for the corresponding participants 113, 123, 133. Each STB provides a content controller for playing out content. A "local content controller" is the collection of elements necessary for playing media locally, and may comprise, for example, a physical DVD player and control systems for managing its operation, alternatively (or in addition), a local content controller might comprise a digital media player, including buffers, decoders, etc., again including control systems for managing its operation such that digital content can be played. A "distributed content controller" as provided herein, is a confederation of separate, local content controllers at each of a plurality of stations, the separate content controllers cooperating to act so that the content playing at each station settles into substantial synchronization with each other. In some embodiments of a distributed content controller, one station may provide the content (e.g., from a DVD or recording previously captured by a DVR) and provide it to the other stations. Typically, in modern systems, a content controller constitutes a logical content controller. This logical content controller manages the playout of digital content from a memory buffer (not shown) having adequate buffer storage at the presenting device, e.g., the STB, in order to handle dropouts and fluctuations in the delivery of digital content, e.g., from the head end 102 or other content source, such as a PVR or DVD (not shown), or from a remote content controller. To ensure reliable playout (i.e., playout without inappropriate pauses or dropouts) in the illustrated embodiment, each STB maintains its own local logical content controller and applies the processes described herein to keep the respective logical content controllers of each STB in substantial synchronization.

The logical content controller of the present principles provides a virtual read head, i.e., a pointer, to indicate the current playout position of the content in the buffer (not shown). Eventually, after the read head has read out a portion of the content for playout, the buffer can flush that content to make room to receive content not yet played. This well-known configuration allows regular, predictable, and reliable access to the content as the content undergoes playout and offers fast, reliable access times for transport commands such as pause, resume, fast forward, rewind, and skip within the buffer. However, this approach exhibits a substantial latency in response to a transport command that requests a large skip forward or backward or calls for different content entirely (i.e., a jump to not-in-buffer content).

The substantial latency results from several causes, including: (a) delays imposed by the STB-to-server communication link in each direction, (2) delays associated with requesting queuing at the content server 103, (3) access time lags at the content server (for an unanticipated change in the playout point), and (4) a STB-imposed requirement for adequate buffering before beginning playout at the new location. Under some circumstances, a single content controller, for example implemented at the server 103 or on a single STB (e.g., the STB 111), could provide the content stream to all participating STBs. Each STB would need to buffer the content differently to account for the transport delay and keep the content presented on each of the content monitors 112, 122, and 132 in substantial synchronization.

Consideration of the communication delays and other latencies of the remote devices remain important to maintaining substantial synchronization of the content playing out across multiple STBs. In FIG. 2, interposing the "play pending" state 202 between the paused state 201 and playing stated 203, and proper setting of the timeout used in the play pending to playing transition 251 serves to address the latency issue. The transition 251 and proper setting of the timeout also remains important when considering other states transitioning to play pending state 202. Other than the timeout transition 251, the remaining transitions in diagram 200 correspond to the transport commands, typically issued by a participant from a remote control (e.g., remote control 115) to a content controller. The local STB (e.g., the STB 111) receives such commands and propagates the commands to the other STBs (e.g., the STBs 121 and 131) with enough additional information to allow the other STBs to synchronize predictably. In some embodiments, such commands also propagate to the head end 102 to provide notice as soon as possible that the corresponding streams requested by the participating STBs (or the position in those streams) would change. The pause command produces the transitions 232 and 252, both of which result in the paused state 201. The other transitions 222, 224, 226, and 228 also result in the paused state. These commands implement easily because they result in a definite, static state (the shared content is paused). In contrast, the transition 231 resulting from the play command while in the paused state, and the transitions 242, 244, 246, and 248 all result in a play pending state (where the shared content should, or will soon, playout).

The skip backward button appearing on the remote control (e.g., the remote control 115), when actuated, triggers the skip backwards command (SK−) which can produce three different transitions, depending on the current state. The current state could be (a) paused state 201, (b) play pending state 202, or (c) playing state 203, which produce transition 221 to skip-/paused state 210, and transitions 241 and 261 both of which lead to the to skip-/playing state 214. Releasing the skip backward button on the remote control 115 causes the command (~SK−) which yields one of two transitions: (a) transition 222 back to paused state 201, or (b) transition 242 to play pending 202.

Similar collections of transitions and states also appear in the state transition diagram 200: The three transitions 225,

245, and 265 result from the rewind button press-induced command (RW) and similarly yields two states: (a) rewind/paused state 212 and (b) rewind/playing 216. Release of the rewind button triggers the command (~RW) which produces transitions 226 and 246 to paused state 201 and play pending state 202, respectively. A like relationship exists between actuation of the skip forward button, which triggers the command (SK+) that produces the transitions 223, 243, and 263 to the skip+/paused state 211 and the skip+/playing state 215. Release of the skip forward button produces the command (~SK+), causing the transition 224 to the paused state 201 and the transition 244 to the play pending state 202.

Finally, a like relationship exists between actuation of the fast forward button to produce the command (FF) which triggers the transitions 227, 247, and 267 to the fast forward/paused state 213 and fast forward/playing state 217. Release of the fast forward button triggers the command (~FF) which produces the transition 228 to the paused state 201 and the transition 248 to the play pending state 202.

Use of content supplied from a DVD can give rise to additional commands, for example (1) chapter+, (2) chapter−, (3) main menu, (4) cursor up/down/left/right, (5) select, etc., typically implemented in similar ways. In practice, commands relating to "static" situations (e.g., cursor moves) achieve a final state directly, but commands resulting in a "dynamic" situation (chapter+ to playing) go through an intermediate synchronizing state such as play pending 202 with an appropriately determined timeout value. Such commands will undergo handling in a manner similar to those discussed herein, as will become apparent based on the further discussions below. Likewise for other commands that arise with Video-On-Demand (VOD) from head end 102, or Over-The-Top (OTT) content streamed from other web sites (not shown), for example as needed to navigate an electronic program guide (EPG) and select what content should be shared from their corresponding inventories.

FIG. 3 depicts transition table 300 illustrating the issuance of a command in response to one or more external events, e.g., actuation of a button on the remote control 115, depending upon the current state of the distributed content controller. Augmentation of a command with at least one parameter can occur based on the aggregate state of the distributed content controller, the current coordinated time, and/or information about the expected performance of each local content controller operation. Transition table 300 has rows 301 and columns 302. Each row corresponds to one of the states in the state transition diagram 200, whereas each column corresponds to one of the button actuations made via the remote control (e.g., the remote control 115). Each cell 303 in the transition table 300 corresponds to a transition in FIG. 2 and provides a command for the distributed content controller to occur when the event in the corresponding one of columns 302 occurs while in the state indicated by the corresponding one of rows 301. In many cases, the indicated command constitutes a null command (e.g., cell 304), which means that no action becomes necessary. There are no actions or columns shown that correspond to the release events ~SK+ and ~SK−, since, for this embodiment, these actions remain null in all situations: All related actions if any, take place on the SK+ or SK− button actuation, not on the button release.

A frequently observed action in table 300 is "Pause to P," as seen in conjunction with transitions 232, 252, 226, and 228. The notation of this command indicates the local device receiving the command should pause at position "P." The position "P" identifies an unambiguous position in the content whose playout is being controlled by the local device at which the event occurs. In practice, the position P corresponds to the current position of the content controller in the shared content in the STB 111 when a command is issued with remote control 115. The position P typically constitutes one of a frame number, a time, or frame offset into the content, or a value of a time code embedded in the content, depending on implementation. The "Pause to P" constitutes a "static" action, and as such will result in all STBs coming into synchronization once they have executed the command (assuming no subsequent commands interfere with this command).

The "Pause to P+d" and "Pause to P−d" constitute variations of the "Pause to P" condition depicted in table 300 in conjunction with the transitions 223 and 221, respectively. Here, "d" represents the variation (delta) used in the system 100 as the basis for a skip. In some implementations, the parameter "d" could constitute a predetermined value, rather than a parameter actually transmitted with the skip command while paused. The skip size "d" represents a measurement in frames or time, and as such could be added to or subtracted from the current position "P" of the local content controller in the shared content when the event occurs, to determine a correct new position in the shared content for the content controller. These actions represent "static" actions as they each take each content controller to a particular, discernable position and wait there indefinitely (at least, until receipt of the next command).

Actions such as "FF from P @ speed S" and "RW from P @ speed S" seen in table 300 occur in conjunction with the transitions 227, 247, 267, 225, 245, and 265, and cause each local content controller (e.g., each STB) to play forward or backward, respectively, at speed factor "S", ideally beginning from position "P." The speed factor "S" constitutes a multiplier. Depending upon implementation decisions, "S" can comprise an integer value (e.g., 2×, 5×) or a non-integer value (e.g., 2.5×, 3.3×), and limited to numbers 1, or not (e.g., 0.5× or 0.0417×) which would permit slow motion. In other embodiments, "S" could represent a value expressed in frames per second (where "1" might be slow motion, "24" is normal speed, and "48" is double speed, etc.).

Interestingly, the two actions "FF/RW from P @ speed S") can represent "static" or "dynamic" actions, depending upon the implementation of each device. In the case of transitions 225 and 227, the next transition is constrained to be 226 or 228, respectively, which constitutes a static command. As long as a participant actuates the FF or RW button, the participant's local device (e.g., the STB) will dutifully play forward or backward at the appropriate speed factor. When the participant releases that button, the local device will propagate the corresponding static command "Pause at P." Ultimately, following the release of the button, playout across all the STBs become synchronized. However, whether (and how well) or not the distributed content controller remains in substantial synchronization during execution of a fast-forward or rewind operation remains an implementation detail.

Consider for example, the press of the fast-forward button: In one embodiment, upon the actuation of the FF button, the local content controller (typically implemented by the local STB 111) provides the current position "P" and begins to playout at 2× normal speed (assuming 2× constitutes a predetermined default for fast-forward speed factor). The local STB 111 will propagate the FF command, with the locally obtained value for P and the current synchronized time T (discussed below in conjunction with FIG. 4), to the remote STBs (e.g., STBs 121, 131). However, the remote STBs do not receive such information until some later time, due to the latency of the communication to the remote STBs. Upon receipt of the fast-forward command, in this embodiment, the remote STBs immediately begin playing at 2× speed, with no regard for the "P" and "T" parameters (since "P" is either correct, or was recently passed and "T" will always be in the past). When the distributed content controller remains in the paused state 201 before actuation of the fast-forward (FF) button, then this action will appear very similar to the participants at all of the participating stations, with the caveat that the remote stations will play this content slightly later, as compared to the station that originated the command. Upon subsequent propagation, receipt, and execution of the static "Pause to P" action, the content controller at each STB once again synchronizes.

A slightly different behavior results when the distributed content controller is in the playing state 203 before actuation of the fast-forward (FF) button. The remote stations, originally in synchronism with the command-issuing station (e.g., STB 111), continue to play content at normal speed while the command propagates to each remote STB (e.g., STBs 121, 131). If the remote STBS obey the command with no regard for P or T, then the remote STBs will present a bit more of the content at normal speed before beginning the fast-forward playout at 2× normal speed. This continues until release of the button and propagation to, and receipt by the remote STBs of the command "Play pending from P @ T+x" (as might correspond to the transition 248 or 246 with respect to a fast forward or rewind command).

In the illustrated embodiment, merely transitioning to the play pending state 202 of FIG. 2 with a timeout of zero will result in an immediate transition 251 to the playing state 203 at normal speed and the restoration of substantially synchronized playout at all stations. Each station will play substantially the same amount of content at 2×, though the start of the portion of the content played at 2× might differ somewhat at each station by as much as the communication latency of the corresponding connections through channel 101.

The illustrated embodiment assumes that the latency of the commands sent from one STB (e.g., STB 111) to another (e.g., STB 121) remains substantially consistent. If the latency does not remain consistent, then, the transition into play pending state 202 (e.g., via transitions 248) can set the timeout in accordance with the interval indicated by the first and second P parameters corresponding to the FF and ~FF commands, divided by the speed S parameter of the FF command. In this way, the time between the actions taken substantially equals the time between the originating button events (or, alternatively, the difference between the two T parameters, presuming that this parameter accompanies with every command). In this way, if the first command undergoes a significant delay and the latter command does not, rather than having too short an interval of 2× playout, the 2× playout will occur for the correct interval.

To manage for the opposite case, where the first command undergoes timely delivery, but the second command experiences a more significant delay, the remote STB can institute a momentary hold off, whereby the STB will delay execution of the first command by the hold off interval. The hold off duration can have predetermined value, represent a worst-case latency, or can dynamically vary based on the observed variance in latency. When the companion second command appears, computation of the interval can occur and the precise duration of the fast-forward operation replicated. This approach reliably restores synchronization in the presence of variable latency, but suffers the drawback that the start of the portion of the content played at 2× differs at each station by as much as the communication latency of the corresponding connections through channel 101 plus the hold off duration.

In still another embodiment, the remote station can compute an intercept position. As an example, assume the command "FF from P @ speed S" associated with transition 267 occurred at a synchronized time $T_1$ but underwent receipt at a later time $T_2$. As a result, the originating station will play the content at speed S, rather than original speed $S_0$. Under such circumstances, the originating station presumably plays ahead of the receiving station by $\Delta P_B = (S - S_0)(T_2 - T_1)$ relative to the receiving station. The receiving station can attempt to catch up, for example by running at speed 2S for a duration of $(T_2 - T_1)(S - S_0)/(2S - S)$, after which the difference of the current playout position between the two stations should become substantially zero.

Thereafter, the receiving station can play at speed S until otherwise commanded. Here, the speed 2S becomes the "catch-up" speed, which can depend on implementation details, or can be predetermined as a matter of preference, or because of particular speeds at which the receiving content controller seems to run well. Later, when the participant at the originating station releases the fast-forward button, so at time T3, playout resumes at the original speed S0, the receiving station will learn of this at time T4. Under such circumstances, the receiving station will overshoot by $\Delta P_B = (S - S_0)(T_4 - T_3)$ and typically pauses (setting the speed to zero or to some value less than $S_0$) for an appropriate duration. As one example, a receiving station can make up an overshoot by pausing for a duration of $(T_4 - T_3)(S - S_0)/S_0$.

In the illustrated embodiment, attempts to correct for the originating station surging ahead or lagging behind occurs using a predictor-principle process. In variations of the illustrated embodiment, the originating station could periodically broadcast its current position P and the corresponding time T, and anticipate that other stations will act as needed using the predictor-principle process to match position. The precise implementation of the predictor-principle process will depend upon specific behaviors of the corresponding local content controller, for example, if specific limits for values of speed exist, or if intrinsic latencies exist when changing speed, pausing, etc. Other constraints could arise in the present implementation, for example to minimize discontinuities in position, or to avoid pausing unless the originating station has paused (i.e., where instead of pausing, a speed of less than one is used while correcting overshoot). In general, the predictor-principle process allows a robust system to maintain synchronization, especially in embodiments that permit multiple events to occur in rapid succession, for example, receipt of a new dynamic command before having reduced the most recently inferred ΔP to zero.

Some commands, for example the "PLAYPENDING from P @ T+x" command, cause a transition to the play pending state 202, where the timeout is set to expire at time T+x, with 'x' representing a hold off based on the worst expected latency between any of the STB pairs. This allows transmission of the command with the expectation that every station will receive the command at a local time $T_R$ before time T+x, so that the transition to play pending state 202 can occur immediately with the timeout being set to $T+x-T_R$. A description of exemplary mechanisms for measuring a reasonable value for x appears below in conjunction with FIG. 4. Alternatively, the distributed content controller system can use a sufficiently large predetermined value (e.g., setting x=500 mS). This approach affords the advantage that content playout starts simultaneously, including at the originating station. Occasionally, due to unexpected latency in communication channel 101, a station might receive a command too late to start on time, but in such a case the predictor-principle process can allow that station to catch up to the originating station.

A race condition can occur when one or more participants 113, 123, and 133 press a respective button on their remote controls 115, 125, and 135, respectively, before propagation of the other actions to all other STBs. To help resolve such a race condition, each button actuation will have an accompanying time tag "T" denoting the time at which the participant pressed the button. The time "T" is determined with respect to each station's local clock, with the each local clock in substantial synchronization with the other local clocks.

Figure 4:
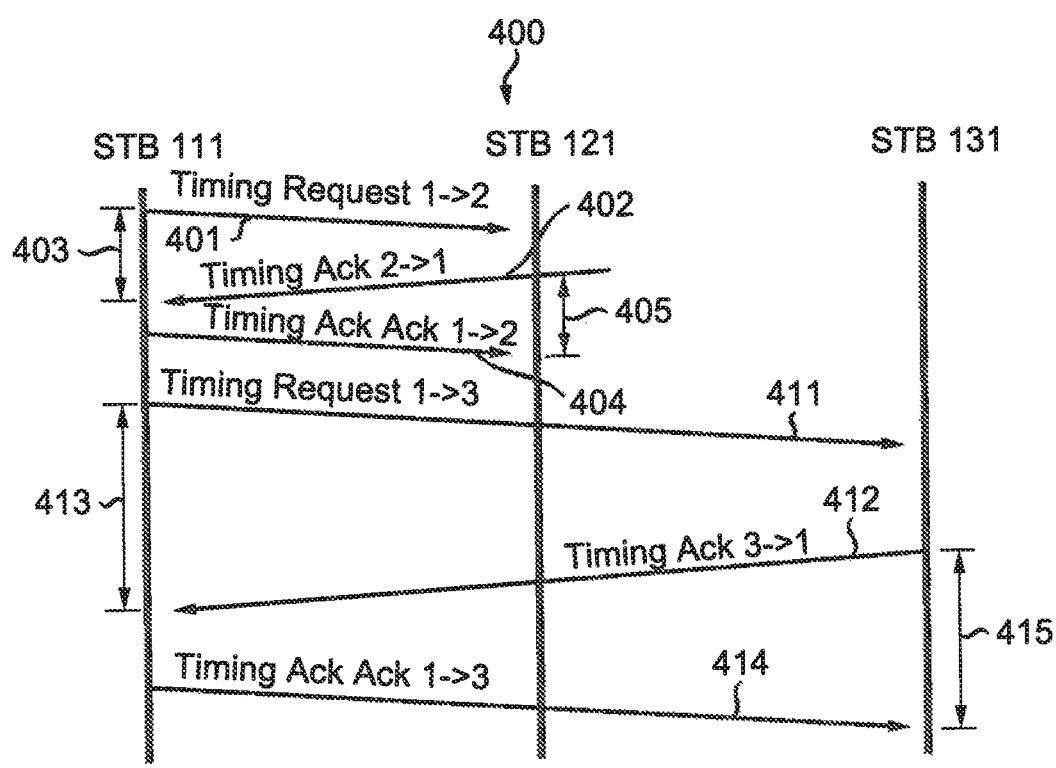
FIG. 4 depicts a transaction diagram for example transactions to establish common timing among content controllers within the distributed content controller of FIG. 1.

FIG. 4 illustrates an exemplary clock synchronization transaction sequence 400 that depicts the manner of synchronizing the clocks among the three STBs participating in the distributed content controller. Each of STBs 111, 121, and 131 communicate with each other. In this example, STB 111 takes the role of master. The STB 111 will send the Message 401 to the STB to establish a timing relationship. The STB 111 notes the time of sending the message 401 as time $T_{111S}$. Upon receipt of the message 401, the STB 121 replies with the message 402. The STB 121 should make this reply as rapidly as possible. In practice, the STB 121 will note the time of sending the message 402 as time $T_{121S}$, and can include this time in a message 402. The STB 111 notes the time of receipt of the message 402 as time $T_{111R}$, and can determine a round trip time 403 as $T_{111R}-T_{111S}$. While not precisely correct, the round trip time represents a reasonable approximation of the latency of transmission $L_{111\ to\ 121}$ in either direction as $(T_{111R}-T_{111S})/2$. If the STB 121 has included the time sent $T_{121S}$ in the message 402, then upon receipt of the time information, the STB 111 can determine the difference between their two clocks in accordance with the relationship $(T_{121S}-(T_{111R}-T_{111S})/2)-T111R$. Subsequently, the STB 111 can translate any time provided by STB 121 into a local time. Upon receipt of the message 402, STB 111 should acknowledge as rapidly as possible with a message 404 sent at a time $T_{111A}$ included in a message 404.

The STB 121 will receive the message 404 at a time $T_{121R}$ and can determine round trip time 405 in accordance with the relationship $T_{121R}-T_{121S}$. The STB 121 can determine the value of the clock of the STB 111 by adding the value of $T_{111A}-(T_{121R}-T_{121S})/2)$ to its own local clock. This allows STB 121 to compute the current value of the master clock (i.e., the clock of the STB 111) from its own clock. In some embodiments, the STB 121 could set its local clock equal to the computed value of the master clock. However, a particular STB can have several different masters over a long operational life. For this reason, the STB should simply maintain the offset corresponding to the master. In a similar manner, the STB 111 synchronizes with STB 131 by exchanging the messages 411, 412, and 414, which allows computation of the round trip times 413 and 415. The sound trip time 415 establishes the offset STB 131 needs to apply to its local clock to determine the current value of the master clock on STB 111.

In any given round trip exchange, the communication channel 101 can introduce asymmetrical or spurious extra latency. While such occurrences can exist, the system of FIG. 1 should synchronize with the minimum round trip times and disregard spurious long round trip times for the purpose of clock synchronization. A statistical analysis of round-trip times can prove useful, for example to determine expected latency (e.g., one implementation can choose to use the average latency, while another might choose the 90$^{th}$ percentile). The highest expected latency among all pairs of participating STBs remains useful for determining the appropriate hold off 'x' as discussed above in conjunction with some of the commands in FIG. 3, unless one elects to use a predetermined value for 'x' (e.g., 500 mS).

Generally, no reason exists to believe that the propagation delays will remain the same between different pairs of STBs, so synchronization should occur between each pair of STBs. In other embodiments, a first STB can serve as the master and each other STB will synchronize to the clock of the master STB. In still other embodiments, all of the STBs can synchronize to another master clock, for example, an authoritative clock using the network time protocol (NTP) server or to a global positioning system (GPS) derived clock. Still, in some circumstances using an appropriate value for hold off 'x' in connections with the transactions described in conjunction with FIG. 4, can prove useful, other than in when synchronizing clocks.

Participants could issue conflicting commands at about the same time because of the propagation delays between pairs of STBs. The system of the present principles advantageously manages such simultaneous commands from participants at different stations to provide an intuitive, usable interface that helps to minimize conflicts and mitigate those that do occur. In the case of similar commands, consider the possibility that two participants (e.g., participants 113 and 123) each actuate the skip backward (SK−) button on their respective remote controls (e.g., remote controls 115 and 125), because something funny just played and both participants want to see it again. Each button press undergoes processing by the corresponding local STB, which propagates the command to the other STBs via communication channel 101. If unmanaged, each of STBs 111, 121, and 131 will skip backward twice, overshooting the funny portion, which neither participant intended. This action would thus introduce awkwardness and confusion for participants using the distributed content controller to view content.

Figure 5A:
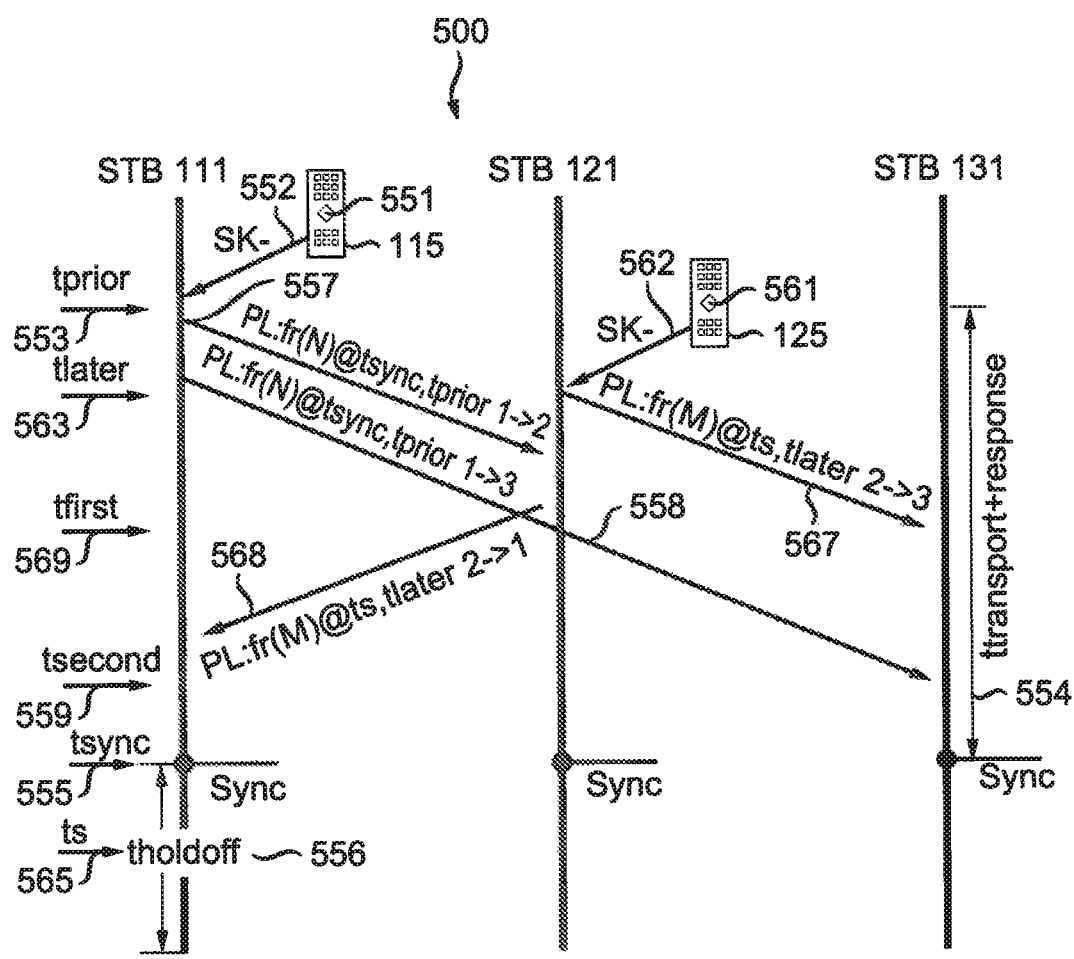
FIG. 5A depicts a transaction diagram for a distributed content controller illustrating an exemplary transport command (e.g., a "skip" command) in the event of a race condition with similar commands (both "skip backwards")

FIG. 5A shows a distributed transaction 500 for handing possible conflicting commands. Each vertical line represents one of STBs 111, 121, and 131. Time progresses from top to bottom in FIG. 5A, with events aligned horizontally occurring simultaneously. While the STBs 111, 121, 131 play out content in substantial synchronization, assume the participant 113 presses the skip-backwards button 551 on his or her remote control 115 to generate the SK− command 552 received by the local STB 111 at time $t_{PRIOR}$ 553. From the transition table 300, this event results in the action 241, "PLAYPENDING from P-d @ T+x." Since P-d corresponds to the current position minus the predetermined difference associated with a SK− (i.e., the skip size), the STB 111 computes this as the position "N." T+x constitutes the current time "T" plus some difference "x" which can constitute a predetermined value or can be based on current latency conditions as discussed above and shown here as $t_{TRANSPORT+RESPONSE}$ 554 (i.e., the amount of time expected to be sufficient to allow for transport delay and response time for the remote content controller). Thus, the STB 111 computes T+x as the time $t_{SYNC}$ 555. Further, to indicate the time of issuance of this command, the command will have the time $t_{PRIOR}$ appended thereto. Thus, the STB 111 sends the command PL:fr(N)@$t_{SYNC}$, $t_{PRIOR}$ to the STB 121 as a message 557, and from the STB 111 to STB 131 as a message 558. The notation PL:fr(N)@$t_{SYNC}$ means "play from position N at time $t_{SYNC}$."

The addendum of $t_{PRIOR}$ to message 557 establishes the temporal priority of the command: In cases of conflict, the earlier command governs. In the unlikely case of a tie in temporal priority, that is, two commands have the same temporal priority value, the command from the participating STB with the higher priority prevails, where, in one example embodiment, the determination of the STB priority depends on the order in which the STBs joined the session. In this case, the STB 111 joined first, the STB 121 joined second, and the STB 131 joined third. Thus, the message 557 will have a tag "1→2," indicating that the command originated from the first priority device (here STB 111) for transmission to the second priority device (STB 121). Note that each message need not include the STB priority, since the other STBs will know from which STB the message originated. As another example embodiment, the STB priority could depend on the STB's IP address, with lower IP address values having a higher priority. Note that in these instances, the STB 111 could act immediately to skip backwards to show the local participant 113 the video that the skip command will play. Various treatments of the local playout appear in FIGS. 6 and 7 discussed hereinafter.

To allow time for commands to take effect, the system 100 can impose a hold off interval, $t_{HOLDOFF}$ 556, specified dynamically or predetermined, to disallow commands by other participants that issue too soon after an earlier command. The hold-off interval allows time for participants subjected to a remote command to see enough of the effect of that remote command. In this way, the participants will make subsequent commands after having the opportunity to understand the remotely induced change of context. For example, a participant has no need to skip back if another participant has already issued such a command. As another example, a participant's attempt to fast-forward would be inappropriate if another participant already seeks to perform the same action. While instituting a hold off interval would not preclude participants from giving conflicting commands, delaying such commands will give such participants the opportunity to realize that their commands will cause conflicts.

At a subsequent time, participant 123 presses skip-backward button 561 on remote 125 generating the SK− command 562 received by the local STB 121 at time $t_{LATER}$ 563. In response, the STB 121 computes "M" as the value for P−d, which need not constitute the same value as "N" since the playout position of STB 111 at $t_{PRIOR}$ will likely not coincide with the playout position of STB 121 at $t_{LATER}$. Likewise, the computation by STB 121 for T+x produces $t_S$ 565, which will likely not equal $t_{SYNC}$. As a result, the STB 121 will send the command PL:fr(M)@$t_S$, $t_{LATER}$ to STB 131 as message 567 and from STB 121 to STB 111 as message 568.

At time $t_{FIRST}$, the STB 131 receives the PL:fr(M)@$t_S$ command in message 567 from STB 121 and, depending upon implementation, could wait until time $t_S$ to act. For example, the STB 131 could enter the PLAYPENDING state 202 with a timeout set to $t_S$-$t_{FIRST}$, or could immediately start playout, but at a position corresponding to $t_S$-$t_{FIRST}$ before position M so as to provide a pre-roll for the actual command, or some similar behavior, some examples of which appear in FIGS. 6 and 7. At some time prior to $t_{SYNC}$+ $t_{HOLDOFF}$, the STB 111 will receive the PL:fr(M)@$t_S$ command in message 568 from STB 121. Since the STB 121 initiated the command at $t_{PRIOR}$, which is earlier than the command initiated at $t_{LATER}$, and as of $t_{LATER}$ the hold off interval 556 of that earlier command had not yet expired, the STB 111 will ignore the latter command in message 568.

At time $t_{SECOND}$, the STB 131 receives the PL:fr(N) @$t_{SYNC}$ command in message 558 from the STB 111. Even though STB has already received a command in message 567 from STB 121, this later-received command has priority, since $t_{PRIOR}$ occurs earlier than $t_{LATER}$. Even if the two commands had the same temporal priority (e.g., both had been initiated at $t_{PRIOR}$), the message 557 would have priority over message 567 because the former message originated from the higher priority STB. As a result, the STB 131 will take action according to the command from the STB 111 in message 558. Depending upon the implementation, the participant 133 could experience no apparent change. The lack of any apparent change would result if the content controller at STB 131 already entered the PLAYPENDING state but now the timeout becomes equal to $t_{SYNC}$-$t_{SECOND}$. The lack of any change could also result if STB 131 had already started a pre-roll that would ultimately synchronize with the playout commanded by STB 121 for time $t_S$. The playout would skip as needed to synchronize with the playout commanded by STB 111 for time $t_{SYNC}$. Another example of no action results from employing a pre-roll, which would cause the STB 131 to recognize that the commands from both remote stations that resulted in a skip-backward by the same difference "d." As a result, no change in the pre-roll or synchronization becomes necessary or the difference remains too small, e.g., one or two frames of video, to warrant correction.

The STB 121 will act in a similar manner upon receipt of the message 557. The command in message 557 has priority over the command 562, and the STB 121 will address this command as necessary to achieve synchronized playout at the time $t_{SYNC}$. Further, the STB 121 will ignore additional commands from remote control 125 affecting the content controller until the expiration of $t_{HOLDOFF}$ 556. Alternatively, the STB 121 can acknowledge receipt of the command by displaying an icon or generating an audible signal indicating that, for now, the STB 121 will ignore such commands. Even so, the STB 121 will accept non-transport commands (e.g., changing these volume), as these affect only the local station. At the time $t_{SNYC}$, each of STBs 111, 121, and 131 play content in mutual, distributed synchronization. Any of the STBs capable of providing pre-roll will have already entered the PLAYING state 203. Those STBs in PLAYPENDING state 202 waiting for the TIMEOUT 251 to occur at time $t_{SNYC}$, have just transitioned to PLAYING state 203.

Figure 5B:
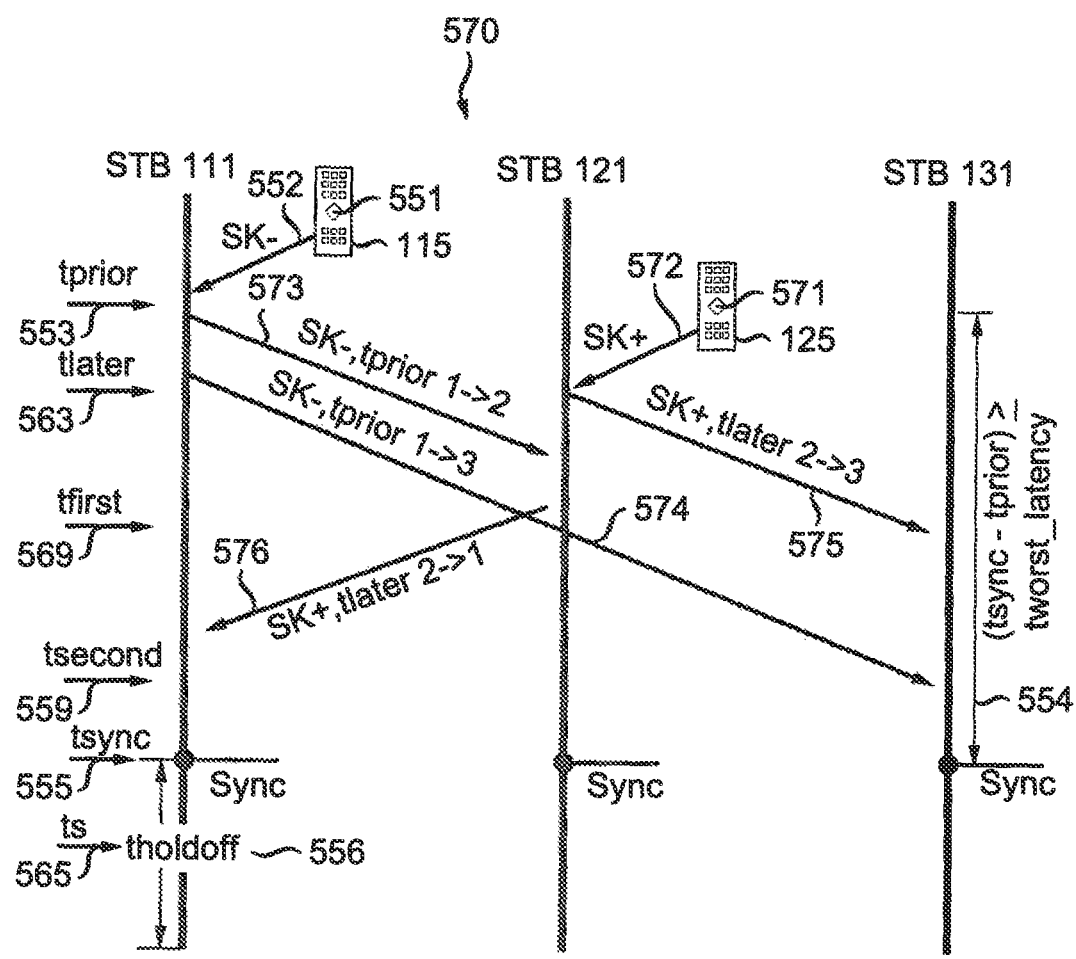
FIG. 5B depicts a transaction diagram for a distributed content controller illustrating an exemplary transport command (e.g., a "skip" command) in the event of a race condition with dissimilar commands ("skip forward"/"skip backward")

FIG. 5B illustrates a distributed transaction sequence 570 similar to transaction sequence 500. FIG. 5B differs by virtue of the participant 123 having pressed skip-forward button 571 on remote control 125, producing the SK+ command 572 (rather than SK− command 562). This action results in the transmission of the command messages 575-576. Under the conditions depicted in FIG. 5B, the SK− and SK+ commands constitute incremental commands, that is, skip backward or forward by a predetermined amount, as opposed to the command format shown in the table 300. Thus, at time $t_{PRIOR}$, the STB 111 sends the command "SK−, $t_{PRIOR}$" in message 573 to the STB 121, then repeats that command for the STB 131 in the message 574. In this case, as before, the STB 111 presumes that the distributed content controller is already in synchronization, whether paused or playing. Further, the STB 111 presumes each station will appropriately handle the skip upon receipt, or in some embodiments, at a predetermined or dynamically determined time increment following the time $t_{PRIOR}$. Likewise, the SK+ command 572 becomes packaged as "SK+, $t_{LATER}$" for transmission to the STBs 131 and 111, via in the messages 575 and 576, respectively. However, if the STB 131 has acted immediately upon receipt of the first command message 575 received at the time $t_{FIRST}$ 569, or if a timeout set by STB 131 for PLAYPENDING state 202 has expired, then upon receipt of the command 574 determined to have priority over already executed command 574 (since $t_{PRIOR} < t_{LATER}$), the STB 131 will need to unwind execution of the earlier, but lower priority command in the message 575. Further, the STB 131 needs to execute the command from message 574 with the result that from the time $t_{SECOND}$ 559 onward, the local content controller of STB 131 behaves as if the STB 131 had only received the second message 574.

This ability to "unwind" a local transport command requires that upon executing a first transport command, the STB must do more than just direct the local content controller in accordance with the command. Rather, the STB needs to maintain a model or sufficient content controller event data to determine at a future time a status for the local content controller had it ignored the first command and maintained the then status quo. Generally, this amounts to noting the content position "$P_1$" and speed "$S_1$" at the time "$T_1$" at the time of execution of the first command (here, 575). Then, at a later time $T_2$, but one sooner than the expiration of a $t_{HOLDOFF}$ (e.g., here, like $t_{HOLDOFF}$ 556, but one, not shown, that would be measured beginning at $t_S$ 565), if an STB receives a conflicting second transport command that has priority over the first command (as does 574), a simple computation provides the content position $P_2$ current at $T_2$ had the STB not executed the first command ($P_2 = P_1 + S(T_2 - T_1)$). In the case where the second command does not have higher priority than the first, the STB will ignore the second command.

As the second command undergoes execution, the STB must remember $P_2$, $S_2$, and $T_2$, for use in the unlikely case that the STB receives a third conflicting and still higher priority command. No higher priority command will conflict with a command for which the $t_{HOLDOFF}$ interval has expired, and this sets an upper limit on how long the STB must remember the $P_1$, $S_1$, $T_1$ combination (or $P_2$, $S_2$, $T_2$). Upon expiration of the $t_{HOLDOFF}$ interval associated with the current highest priority command, the STB can forget the corresponding P, S, T combination. Note that the time T for each command represents that command's priority. In the case of a tie, use of a further mechanism for determining priority might become necessary, as discussed above. Thus, for each executed command, the STB should retain a priority value or have the ability to determine priority as long as the STB retains the current P, S, T combination to allow for a complete priority comparison with any newly received commands.

Note that upon receipt of higher priority message 557 or 573, STB 121 will accept no further commands from the remote control 125 until the expiration of the $t_{HOLDOFF}$ interval 556 associated with command 552. The STB 131, having no local commands, will not accept commands from the remote control 135 upon receiving the message 575 up to a corresponding hold off time (not shown). Upon receiving a higher priority command in the message 574, the STB 131 could relax that restriction to require only the expiration of $t_{HOLDOFF}$ interval 556.

Unlike the STB 131, the STB 111 incurs no such restriction. The received command message 576 has a lower priority than the command 552 already in effect so the STB 111 will ignore the message 576. So long as $t_{HOLDOFF}$ 556 has not expired, the participant 113 can use his or her remote 115 to issue another command and it will be accepted in connection with the distributed content controller. Once a participant's command has priority, subsequent commands do too, until the last hold off interval expires and "priority" is now up for grabs. This allows a participant 113 to initiate an action, e.g., to search for a particular scene, that may require more than one command 552, e.g., skipping back several steps. In this manner, the participant has the authority to perform each skip without intervening commands from other participants, such as participants 123 and 133, interfering or confounding such efforts. However, upon expiration of the hold off interval corresponding to the last skip has expired, then any of the participants' commands will become accepted locally and for sharing, which could result in another command conflict for resolution by this priority mechanism.

FIGS. 5A and 5B show two exemplary command representation mechanisms. The commands in sequence 500 possess the property of being fully qualified with the target frame numbers (e.g., "N", "M") and target synchronization times (e.g., $t_{SYNC}$ 555) as also seen in table 300. The commands in the sequence 570 appear relative to their issuance times (e.g., $t_{PRIOR}$ 553). For each command received currently having the highest priority, the exemplary handling mechanisms shown include waiting until the synchronization time before taking action, pre-rolling as appropriate so as to achieve substantial synchronization at the synchronization time, and pausing at the synchronization point until the synchronization time.

These command representations (and others not shown) and handling mechanisms (including others not shown) can be selected by action (e.g., by entry in table 300) and by an STB. That is, the different actions in the transition cells 303 can manifest themselves in the command messages in different ways, and the individual STBs 111, 121, and 131 can respond to the same action in different ways. However, in general, the distributed content controller comprising the local content controller of each cooperating STB will maintain substantial synchronization of a few frames or a fraction of a second and only momentary divergences during the propagation and conflict resolution of commands.

Figure 6:
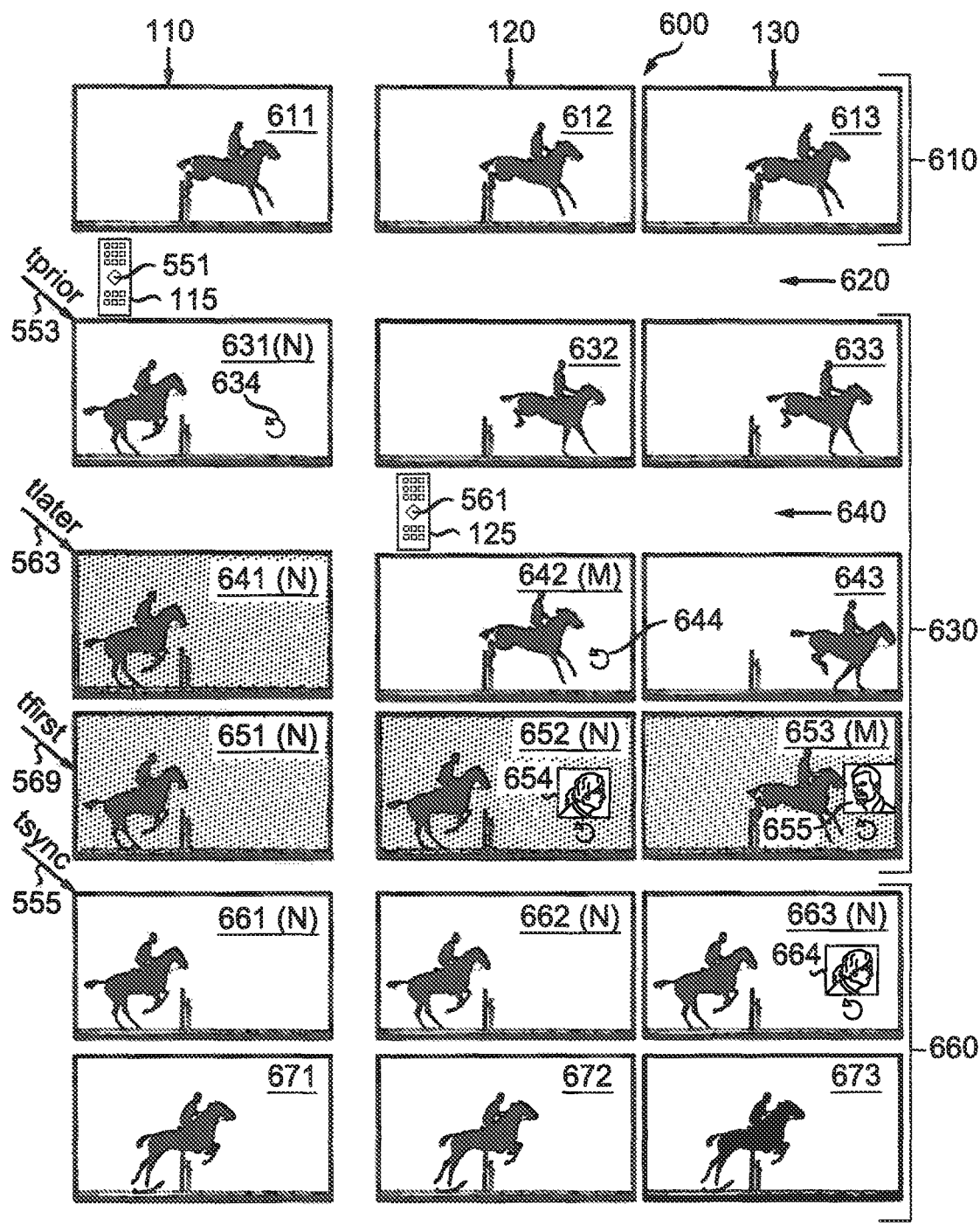
FIG. 6 depicts the distributed transaction illustrated in FIG. 5A, as seen by each of the participants in the distributed audience of FIG. 1, with video paused as the distributed content controller of FIG. 1 restores synchronization.
Figure 7:
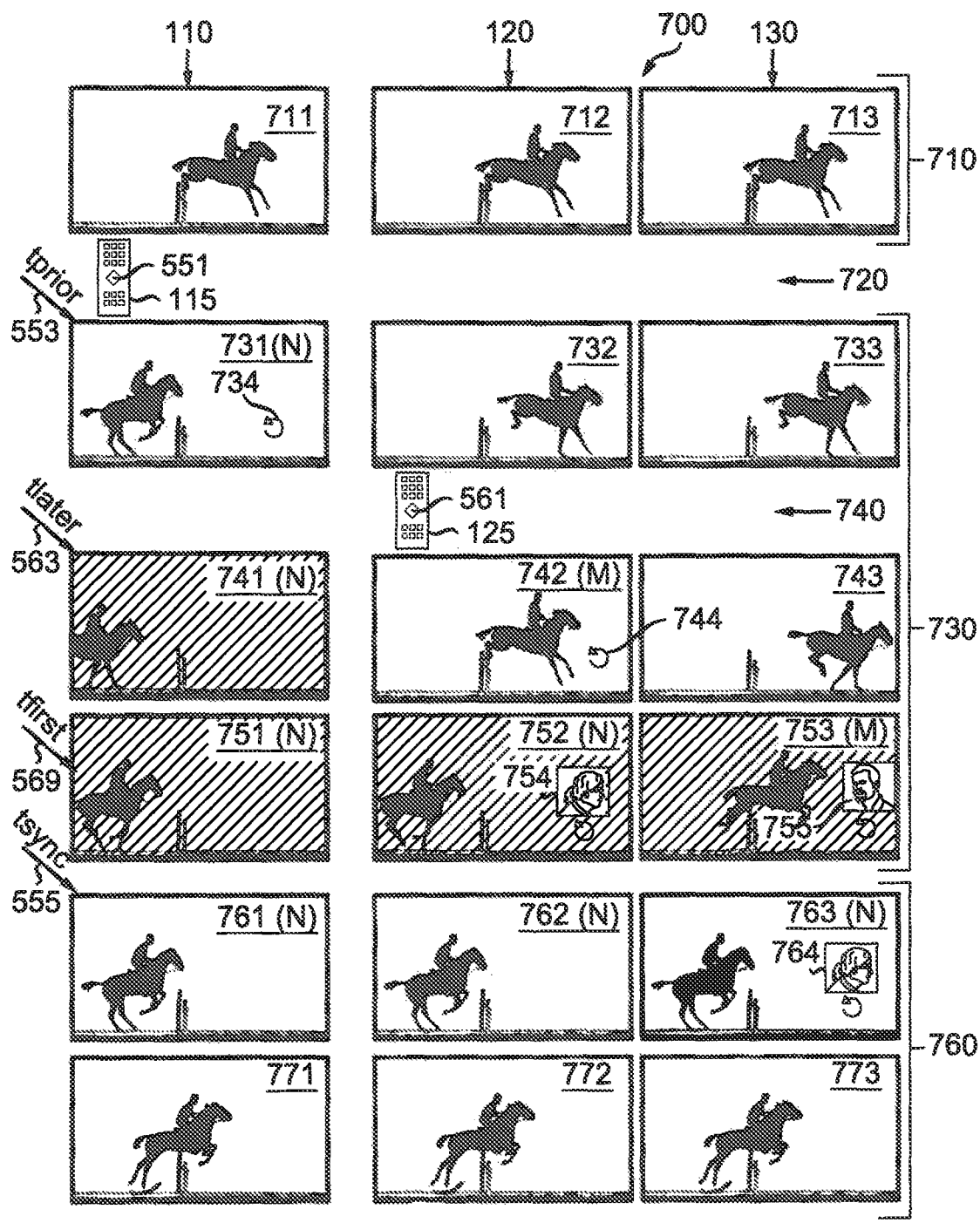
FIG. 7 depicts an alternate embodiment of the distributed transaction of FIG. 5A with the video pre-rolling as the distributed content controller of FIG. 1 restores synchronization.

FIGS. 6 and 7 each show the effect of different responses to the transaction sequence 500. FIG. 6 depicts a pause in PLAYPENDING state 202 while awaiting the time $t_{SYNC}$ 555 (that is, the PLAYPENDING timeout is set to expire at $t_{SYNC}$). In contrast, FIG. 7 depicts a pre-roll in the PLAYING state 203 with synchronization assured at or before the time $t_{SYNC}$. (that is, the PLAYPENDING timeout will expire at or before $t_{SYNC}$, and if before, then the PLAYING state 203 will start from a position $t_{SYNC} - t_{START}$ before the designated position N). As depicted in FIG. 6, the shared presentation 600 undergoes display on the monitors 112, 122, and 132 at the stations 110, 120, and 130, respectively. At the time 610, the presentation synchronizes and the displays 611, 612, and 613 appearing on corresponding monitors 112, 122, 132, respectively, depict substantially the same image. At the time 620, the participant 113 at the station 110 presses the skip backward button 551 on the remote control 115, resulting in receipt of the SK− command by the STB 111 at time $t_{PRIOR}$ 553. The current frame 631 becomes set to "N" for the STB 111, which corresponds to a skip backwards by a predetermined value, and playout pauses. However, the stations 120 and 130 continue to play, currently uninformed about the command from the station 110. Thus, the ongoing playout frames 632 and 633 to appear at the stations 120, and 130, respectively. The skip backward icon 634 appears on the display at the station 110. In this example, the command issuing station 110 pauses at "N" awaiting the designated resynchronization time $t_{SYNC}$ 555.

At time 640, the participant 123 at the station 120 presses the skip backward button 561 on the remote control 125 resulting in receipt of the SK− command by the STB 121 at time $t_{LATER}$ 563. The current frame 642 at station 120 now becomes set to "M" corresponding to a skip backwards by the predetermined value. Playout pauses and the skip backward icon 644 now appears on the local display. The Station 110 has paused on the frame 641 as depicted in FIG. 6 by the stippled background. The station 130 continues to play frame 643, still unaware of the remotely generated commands.

The remote control events at times 620 and 640 generate the command messages 557, 558, 567, 568 as shown in FIG. 5A. At time $t_{FIRST}$ 569, the STB 131 at the station 130 receives the message 567. At the same time, the STB 121 at the station 120 receives the message 557. As a result of the receipt of these two command messages, the station 120 shows frame 652 paused in response to the command from the station 110. The station 130 shows frame 653 paused in response to the command from the station 120. The skip backward icon 654 undergoes display to the participant 113 at the station 110, in this example attributing the command using an image representing the participant 113. At the same time, the skip backward icon 655 becomes attributed to the participant 123 at the station 120 in a similar manner. At this point, the station 130 has only received the lower priority command from the station 120 and has skipped back, but not so far as the stations 110 and 120 have skipped.

By the time $t_{SYNC}$ 555 arrives, the STBs 111 and 131 have received the command messages 568 and 558. The STB 111 will ignore the message 568, since that STB already knows of a higher priority command 552. However, when STB 131 at station 130 received message 558, that message had a higher priority and took precedence over the command in the message 567. As a result, station 130 accepted the higher priority command and skipped to frame "N." At the time $t_{SYNC}$, each of stations 110, 120, and 130 begin showing substantially synchronous images 661-663, respectively. The Station 130 will also show a skip backward icon 664, but the icon now becomes attributed to the participant 113. Subsequently, the three stations continue to play images 671-673 in substantial synchronization. The skip backward icons 634, 644, 654, 664 disappear after an interval, which can constitute a predetermined time (e.g., about 1 second as shown), or may persist until the synchronization point (e.g., time $t_{SYNC}$ 555), or until the hold off interval (e.g., time $t_{HOLDOFF}$ 556) has expired. Note that icon 655 was replaced by the icon 664 corresponding to a higher-priority command 558. This latter policy affords the advantage of providing a visual indicator to show that another participant currently has command priority. However, as seen with the icons 655 and 664, the participant that currently has priority can change The icons provide a visual reminder of why the local remote seems to have no effect (due to another participant having priority). During the intervals 610, 620, and 660, the stations 110, 120, and 130 operate substantially in synchronization, whereas during the interval 630, the statuses of the stations temporarily diverge.

FIG. 7 shows a shared presentation 700 in response to the same transaction sequence 500 as discussed earlier, but under the circumstances when the stations pre-roll the video to achieve rolling synchronization on a designated frame N at the designated time $t_{SYNC}$ 555. At time 710, the stations 110, 120, and 130 display synchronous frames 711, 712, and 713, respectively. At time 720, at station 110, the participant 113 issues the SK− command 552 for receipt by the STB 111 at the time $t_{PRIOR}$ 553 with the instant result that frame 710 becomes designated as "N," and backward skip icon undergoes display 734 locally on the monitor 112. Remote stations 120 and 130 remain yet unaware of the command 552 and continue to display the frames 732 and 733, respectively.

At time 740, the participant 123 issues SK− command 562 for receipt by the STB 121 at the time $t_{LATER}$ 563. The frame 742, representing the local backwards skip, becomes designated as "M," and the backward skip icon 744 undergoes display on the content monitor 122. The remote stations 110 and 130 remain yet unaware of the command 562: The STB 131 continues to play on, now at frame 743, whereas the STB 111 has skipped backward beyond frame N and now plays frame 741, representing a pre-roll event. The participant 113 can dim the display of frame 741 or otherwise tag the frame (as indicated by the hash in FIG. 7) so that participant 113 have an awareness that the other participants 123 and 133 may not view this pre-roll as shared content (though it might be).

At the time $t_{FIRST}$ 569, the STB 111 still plays the frame 751, thus still performing the pre-roll operation in response to the local command 552. The STB 121 has skipped back and now plays the frame 752. Thus, the STB 121 now executes the pre-roll operation in response to receipt of the remote command message 557. Further, the STB 121 triggers the display of the remote skip backward icon 754 attributed to the participant 111, or alternatively, attributed to the station 110 or not attributed at all. The STB 131 has skipped back and now plays the frame 753 as a consequence of executing a pre-roll operation in response to receipt of the remote command message 567. Further, the STB 131 will trigger the display of the remote skip backward icon 755 attributed to participant 121. For those stations engaged in a pre-roll operation (e.g., the stations 110 and 120) corresponding to the highest priority command, their images (e.g., images 751 and 752) substantially synchronize.

At the time $t_{SYNC}$ 555, each of the monitors 112, 122, 132 displays the frame N (images 761, 762, 763), with the station 130 also showing the remote skip backward command icon 764 attributed now to the participant 111. The displays become substantially synchronized and remain so as playout continues, this displaying the images 771, 772, and 773. During the intervals 710, 720, and 760, the distributed content controller remains in substantial synchronization and during interval 730, the statuses of some stations diverge.

Figure 8:
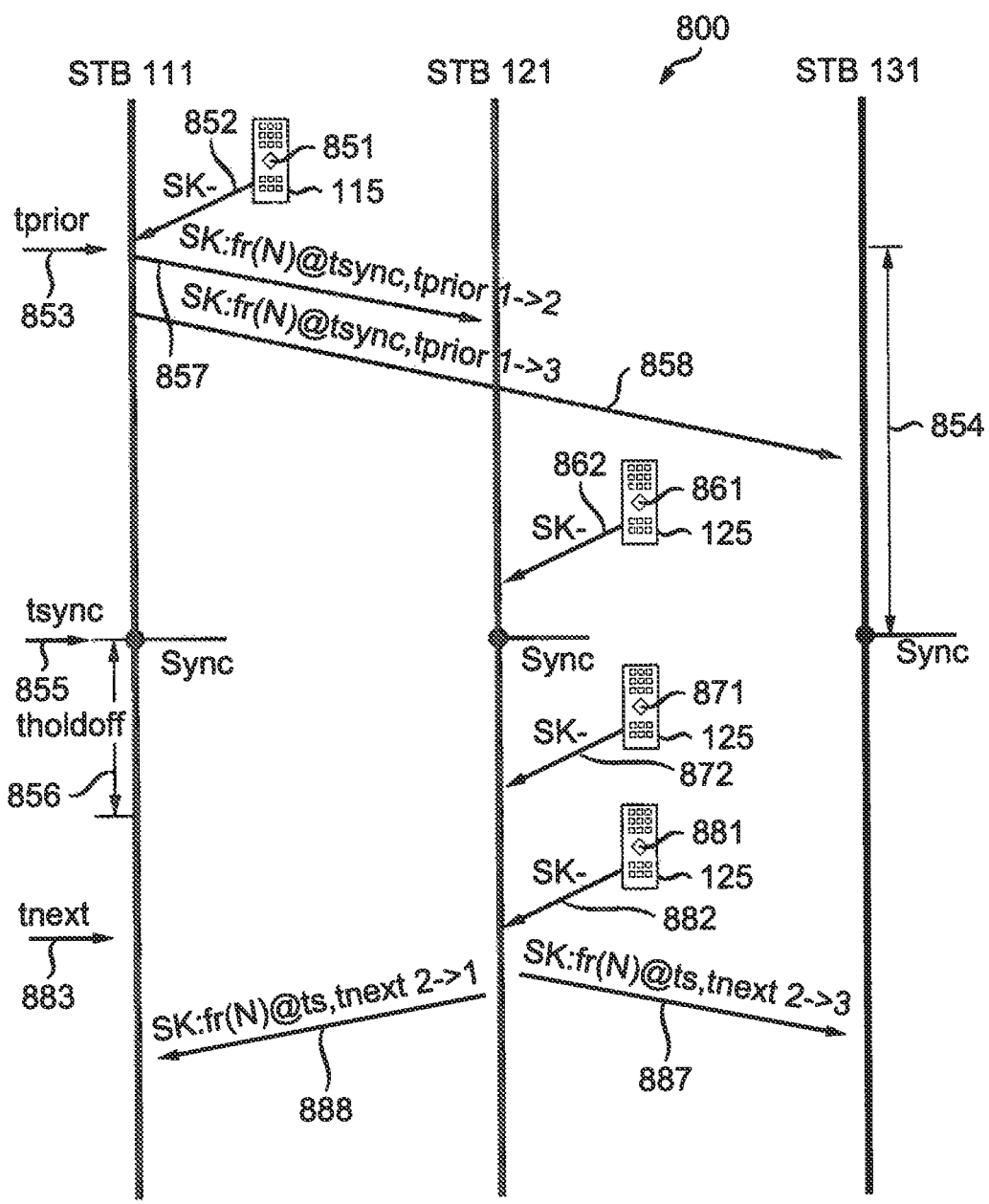
FIG. 8 depicts a transaction diagram for a distributed content controller illustrating another exemplary transport command, exhibiting the hold-off behavior of the distributed content controller of FIG. 1.

FIG. 8 shows a transaction sequence 800, which illustrates another purpose and effect of the hold off interval. At time $t_{PRIOR}$ 853, the STB 111 receives the SK− command 852 resulting from a button press 851 on the remote control 115. The STB 111 sets the time $t_{SYNC}$ 855, either by dynamically determining this interval or in accordance with the predetermined transport delay and response time interval 854. The STB 111 transmits the resulting command to the STB 121 and the STB 131 by messages 857 and 858, respectively. Following receipt of the message 857 by the STB 121, that STB will ignore transport commands such as the transport command 862 from resulting from a button press 861 on the remote 125 until the synchronization time ($t_{SYNC}$), because the command has lower priority (the command arrives later) than the command 852 (as relayed by the message 857). Further, even after the time $t_{SYNC}$ 855, if policy requires a hold off interval such as time $t_{HOLDOFF}$ 856, then the STB 121 will also ignore transport commands such as the transport command 872 resulting from a button press 871. If, after the time $t_{HOLDOFF}$ has expired, e.g. at $t_{NEXT}$ 883, the STB 121 will receive a transport command 882 resulting from a button press 881. The STB 121 will accept and propagate that command to the remote stations 110 and 130 via messages 888 and 887, respectively.

The hold off interval does not apply to the station that issued the priority command (here, the station 110 with its STB 111). This allows the participant issuing a priority command (here, the participant 113 at the station 110) to issue subsequent commands for whatever purpose without interference from other participants' commands. Further, this also allows adequate time for another participant (here, the participant 123) to see what has occurred before issuing commands (e.g., command 882). By not issuing a command to follow the command 852 before the expiration of the time $t_{HOLDOFF}$ 856, the participant 111 will thus cede priority to any other participant. Disallowing the commands 862 and 872 before expiration of the hold off interval ensures that the participant 121 has the opportunity to see the results of a higher priority command, e.g., command 852 before initiating an unrelated command. These important aspects of a distributed content controller of the present principles, if absent, would likely result in confusion, dissatisfaction, and even outright conflict.

Figure 9:
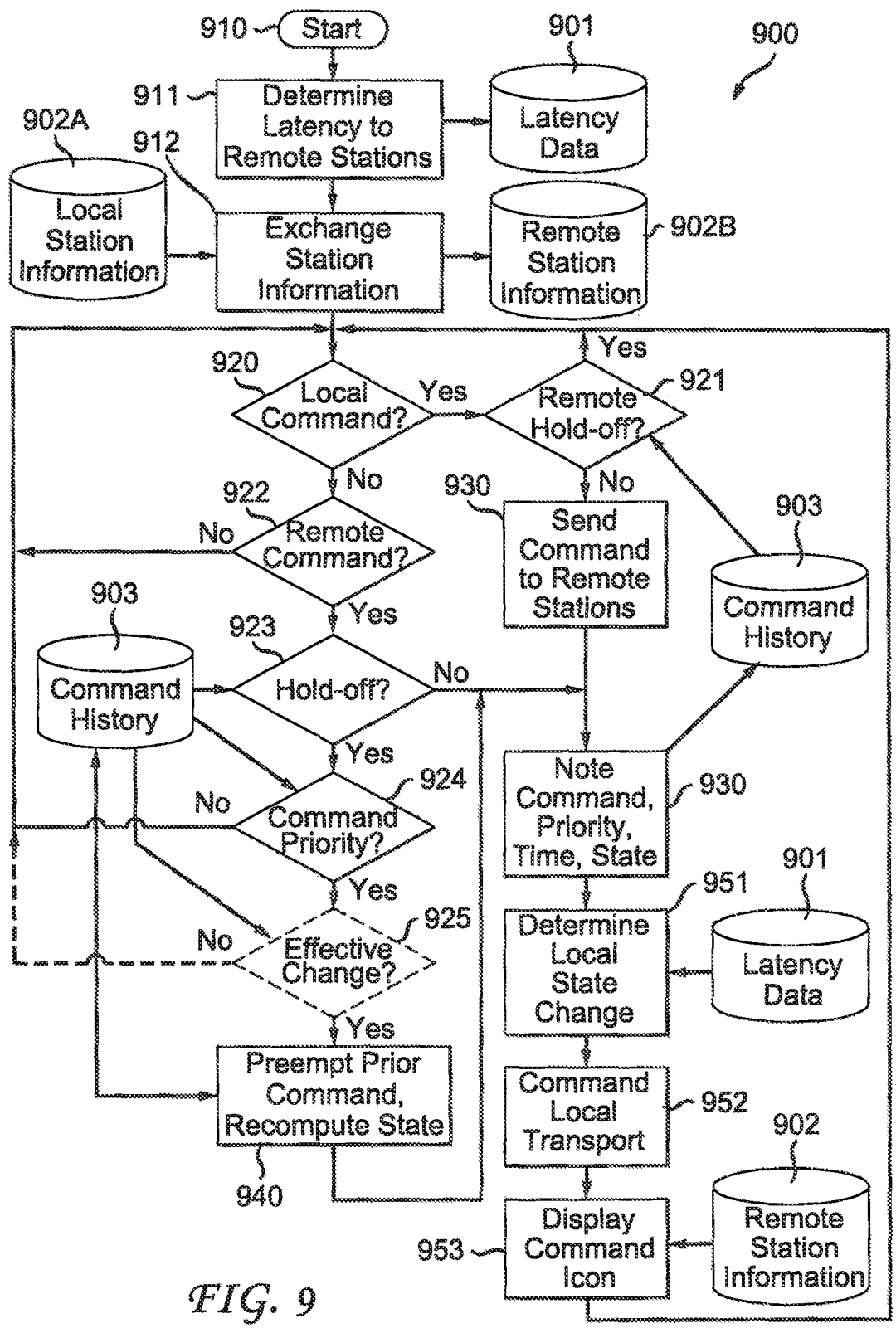
FIG. 9 depicts, in flowchart form, a content controller process for participation in a distributed content controller for playing shared content in accordance with a preferred embodiment of the present principles.

FIG. 9 depicts command handling process 900, as would be executed by STB 111 for participation in a distributed content controller. The process 900 starts at step 910 with the STB 111 already connected to one or more remote stations (e.g., the STB 121 and 131). In some instances, at step 911 the STB 111 will determine the latency to each of the remote stations, as for example with clock synchronization process 400, with the results stored as latency data 901. In other embodiments, especially where the STB 111 makes use of other mechanisms upon for establishing local clock time, latency data 901 can be predetermined Latency data 901 provides sufficient information to for the local station (e.g., the station 110) to accurately estimate the time (e.g., $t_{SYNC}$ 555) at which a remote station (e.g., the station 130) will be able to execute a locally originated command (e.g., the command 552) sent to the remote station (e.g., via message 558). In the reverse circumstance, the latency data 901 allows the local station (e.g., the station 130) to accurately estimate the time ($t_{SYNC}$ 555) at which a remotely originated command received in a message (e.g., 558) will undergo execution by the remote originating station (e.g., the station 110).

The latency data 901 data can exist in different forms. For example, the latency data could constitute an offset to the clock of the master station, which, for the master station would be zero. Alternatively, the latency data 901 could constitute data representing the offset of the local clock to each of the other remote clocks. Still another example of latency data usable with pre-synchronized clocks would be a record of transport latency to each remote station. Some embodiments having sufficiently accurate pre-synchronized clocks and using predetermined values rather than actual transport latencies might require no data acquisition at all, in which case the latency data 901 would constitute a set of predetermined values.

At step 912, the station 110 will exchange its information with each remote station. Information about the local station (e.g., the station 110) resides in, and downloads from, a local station information store 902A, typically resident in the STB associated with that local station. The local station (e.g., the station 110) records information obtained about remote stations (e.g., the stations 120 and 130) in a remote-station information store 902B. Station information can include a picture, name, icon, or number representing the local participant or station for use in attributions such as the participant attributions included in the icons 654, 655, 664, 754, 755, and 764 (which icons can make use of participant's pictures). Thus, at station 110, the camera 117 could capture a picture of participant 113, or the participant's picture could otherwise undergo storage in the local station information store 902A accessible to the STB 111. The capture or provisioning of the participant's picture could occur concurrently with the beginning of the process 900 (not shown). Alternatively, the participant's picture could exist as of the start step 910. Station information received from each remote station undergoes storage in the memory 902B.

In some circumstances, rather than each station exchanging information with each other station, one of the participating stations could serve as a master. Thus, one station could operate as the clearinghouse for station information, in which case, the exchange of station information during step 912 would occur with the station designated as the clearinghouse. Each station might require an occasional update as other stations join the distributed content controller. In still other circumstances, a server 103 can keep station information for access by other stations. Additional station information provided for exchange can include the properties of each local content controller. For example, if some local stations have a limit on the fast-forward rate of 10×, but other stations can achieve 20×, the distributed content controller may become constrained to the lower limit. In other implementations, the stations having slower content controller capabilities might resort to skipping forward, rather than fast-forward playout, thereby not constraining operation of the distributed content controller to the "lowest common denominator."

Another example of a potential disparity between stations could occur with respect to the expected setup time for a play command: Some stations may have fast seek times, while others operate to seek more slowly, and the distributed content controller could face limits on performance to the lowest seek time of the participating station. Another limit on performance could result if different stations implement different sizes of skip for skip-forward and skip-backward commands.

Other station information could include the available sources of content. FIG. 1 depicts exemplary embodiment in which the head-end 102 serves as the source for shared content. If one or more the STBs support additional head-ends (not shown), or support "over-the-top" Internet streaming for one or more services, or support locally cached content, then the stations could share content from such alternative sources. Having more sources of available content would ease the decision of "what to watch," for example by offering the participants 113, 123, and 133 content that all three STBs 111, 121, 131 can access and share. Constraints could limit the content search capabilities available to the participants. Further, the electronic program guide could include an annotation to indicate which participants (or stations) can share each program. This feature would enable the group of participants to recognize which participant's configuration most constrains the group's breadth of content choice, which in turn suggests who not to invite next time, or who should consider an equipment or service upgrade In connection with the process 900 depicted in FIG. 9, the various examples discussed below rely on the preceding discussion of examples with respect to the point-of-view of particular stations. To be clear, the following process steps undergo execution by each station in connection with the distributed content controller, each station having its corresponding point-of-view: For the process 900 occurring at STB 111, that STB will act as the "local STB," whereas the other STBs 121, 131 will appear to the STB 111 as "remote STBs." The fact that various examples sometimes call out different STBs as the "local" or "remote" devices results from the previous discussion with respect to FIGS. 3-8 not having provided all of the conditions for any one station.

The process 900 includes a main loop executed beginning from step 920. Initially, a check occurs to determine the occurrence of a local command (e.g., the occurrence of one of commands 852 and 862). If so, then during step 921, a check occurs for an active (unexpired) remote hold off interval (e.g., time interval 856), as reflected in the command history buffer 903. If an active remote hold off interval currently exists, the STB will ignore the local command and restart the main loop during step 920. Examples of this situation occur when the STB 121 receives the commands 862 and 872, since the hold off interval 856, related to command 852 from remote station STB 111, has not yet expired. The local STB can beep, flash an icon, or otherwise indicate the rejection of a command in this way. In some instances, the STB can initiate the display of a remote station command icon (e.g., icon 654) on the local content monitor (e.g., 122), further informing the local participant (e.g., 123) of the reason why the local command is blocked.

During step 921, the check performed could reveal that no active remote hold off remains in place. For example, this circumstance would exist with the command 882, since by the time $t_{NEXT}$ 883 occurred, the earlier remote hold off 856 has expired. With no active remote hold off, step 930 undergoes execution to process the local command (e.g., command 882) at which time, the STB sends the local command to each remote station (e.g., as messages 887 and 888). During step 950, the command history buffer 903 takes account of the command undergoing processing, including information representing or based on the current position P, speed factor S, time T, prior to the command. The command history buffer 903 can also take account of the hold off expiration time corresponding to this command, or can derive this value as needed from T. For the case when information in addition to T is necessary to determine command priority, such as for cases where two commands occur simultaneously at time T, the command history buffer 903 can record the additional priority information, too (e.g., the station providing the command, the IP address of the station providing the command, etc., as described above).

During step 951, a check occurs whether a change occurred in the local content controller state, which can include computation of an appropriate timeout value for the PLAYPENDING state 202, as previously discussed. This computation can consider the local content controller state just noted at step 950 (i.e., position P and speed S), and can consider the local content controller performance limitations, such as seek time, slew rate, fast-forward/rewind speed limits or quantization, etc. This computation provides a good translation of the command for use by the local content controller. If all the stations have identical local content controller performance parameters, then this computation becomes trivial. However, if the performance parameters differ, e.g., one command specifies a fast-forward at 3×, but the local content controller can only do 2× or 5×), several possibilities exist to resolve the difference. For example, the STB could choose a single speed (e.g., 2×). Alternatively, the STB could execute a more complex sequence of commands (not shown) to dither the fast-forward rate between 2× and 5×. For example, the STB could run at 2× for 2 seconds then at 5× for one second, repeatedly, which averages 3×, but never outpaces a content controller running at 3×). In either case, the STB will need to execute a "fix-up" when processing a later pause or a normal speed playout command. In some cases, the computation occurring at step 951 will provide the necessary fix-up required due to an approximation of a prior command (e.g., the dithered fast-forward speed)

In cases where a remote command undergoes processing during step 951, the latency data 901 can serve to determine an appropriate timing offset as needed so that the command as executed at each station results in eventual synchronism (as achieved during intervals 660 and 760). An example of the use of latency data 901 would result should command message 557 be expressed as $t_{SYNC}$ according to the local clock of STB 111, and then undergo a translation into the local clock of STB 121 when processed that STB so that substantial synchronization occurs globally at $t_{SYNC}$ 555.

During step 952, the local STB 111 issues the transport command computed during step 951 to the local content controller. For example, if the local content controller comprises a DVD player and the command was to begin playout, a play command would be issued to the DVD player at the appropriate time, including compensation for any predictable latency in the DVD player response. If the local content controller comprises a digital media player, including an input media buffer, then the play command would ensure that the appropriate content had been staged into the buffer in time for playout to begin when and where the command had specified.

At step 953, if desired, a command icon can undergo display on screen for some amount of time. In the case of a local command (e.g., the command 552 at the STB 111), a local command icon (e.g., the icon 634) can undergo display on the monitor 112. In the case of a remote command (e.g., message 557 received at the STB 121), an attributed command icon (e.g., icon 654) can undergo display on a monitor (e.g., monitor 122) using information corresponding to the remote station (e.g., the STB 111) from remote station information store 902. The command icon can undergo display for time interval corresponding to the next passage through step 953 to represent the most recent priority command. Alternatively, the command icon could undergo display until the expiration of the corresponding hold off interval, if earlier, but not less than some predetermined minimum time (e.g., 1 second), so that there is always an opportunity for a participant to determine the cause for the current change in state.

At this point, processing restarts the main loop during step 920, with the command icon set to disappear according to the timing determined at step 953 unless replaced sooner. Any local transport command sequence (e.g., the dithering fast-forward speed example executed during step 951) will continue as needed until cancelled by a subsequent command. If there no local command requires handling during the step 920, then a test occurs during step 922 to check for receipt of a remote command message (e.g., messages 557, 567, and 568). In the absence of a remote command message, then processing restarts the main loop at step 920. Upon receipt of a command message, then during step 923 a test occurs to determine whether any hold offs remain active. The command history buffer 903 will have undergone updating during each prior execution of step 950, and if no hold offs exist, or none exist that remain unexpired, processing of this new remote command continues during step 950. Examples of this include the initial receipt of command message 567 by STB 131 and receipt of command message 888 by STB 111 after the expiration of $t_{HOLDOFF}$ 856.

However, if a hold off remains active, whether associated with a remote or local command, then during step 924 a check occurs, again using data from command history 903, to determine whether the new remote command has a higher priority than the previously priority command. If not, the STB will silently discard the new remote command and restart processing at step 920. An example of this occurs upon the receipt of command 568 by STB 111 while $t_{HOLDOFF}$ 556 has not expired.

If, during step 924, the new remote command has a higher priority (examples of which include the receipt of the messages 558 and 574 by the STB 131), then during step 925 an optional test undergoes execution to determine whether the newly received higher-priority command represents an effective change. If no effective change has occurred, that is, if the observable behavior of the local station would not substantially change by executing the new higher priority command instead of the previous command, then the station can forego execution of the higher priority command. An example of this occurs with some of the embodiments discussed in conjunction with the receipt by STB 131 of command message 558, where two different SK− commands 552 and 562 can result in different behaviors during an interval of divergence (e.g., intervals 630 and 730), but eventually result in substantially synchronism at some later time (e.g., intervals 660 and 760). If the interval of divergence does not become too severe or disruptive, then no strict need exists to issue the actual higher priority command. In fact, the display as presented on the local content monitor might actually show less disruption than actually exists. Nonetheless, recording of the actual higher priority command in command history 903 remains desirable, though the record could include a notation that the command did not execute. The STB would provide a display of the appropriate attributed icon, so that the local participant will receive a visual indication that a particular remote station now has priority, though this action does not appear in connection with the step 925.

If the test undertaken during step 925 determines that the new higher priority remote command represents an effective change (or if the implementation does not execute the test during step 925 and test executed during step 924 found the new command to have priority), then during step 940, the STB 111 will pre-empt one or more prior commands and process the new higher priority command during step 950. An example of this series of events occurs upon receipt of the SK− command message 574 by the STB 131, which follows the prior SK+ command 575: The SK+ command becomes preempted, and the higher priority SK− command undergoes processing by the STB 131. In some cases, computation of a hypothetical status of the local content controller will occur, a status that would have been current had the now-preempted commands not undergone execution. The position/speed/time state recorded in the command history 903 during an earlier performance of step 950 associated with the earliest preempted command can readily yield such a hypothetical status. The hypothetical status of the local content controller constitutes an extrapolation of the recorded state to a time (implementation dependent) somewhere between the current time and the effective time of new priority command. In practice, the effective time constitutes the time $t_{SYNC}$ given in from the message 574 or discernible from policy or station information. This hypothetical status is the one recorded during step 950, rather than the actual status induced by the now-preempted command(s).

Note that for some implementations, especially those that provide adequate allowance for message latency and device response times, any fix-up needed from the actual local content controller status to the hypothetical status remains trivial. For example, consider the STB 131 in FIG. 5A whereupon receipt of the message 567, the local content controller may have jumped to frame "M", paused, and waits in the PLAYPENDING state 202 with a timeout set to for the time $t_S$. Upon receipt of the higher priority command in message 558, the STB 131 will pre-empt that timeout. In subsequent processing of the new priority command (steps 950-953), the local content controller jumps to frame "N" and waits with the timeout of the PLAYPENDING state set for time $t_{SYNC}$.

Figure 10:
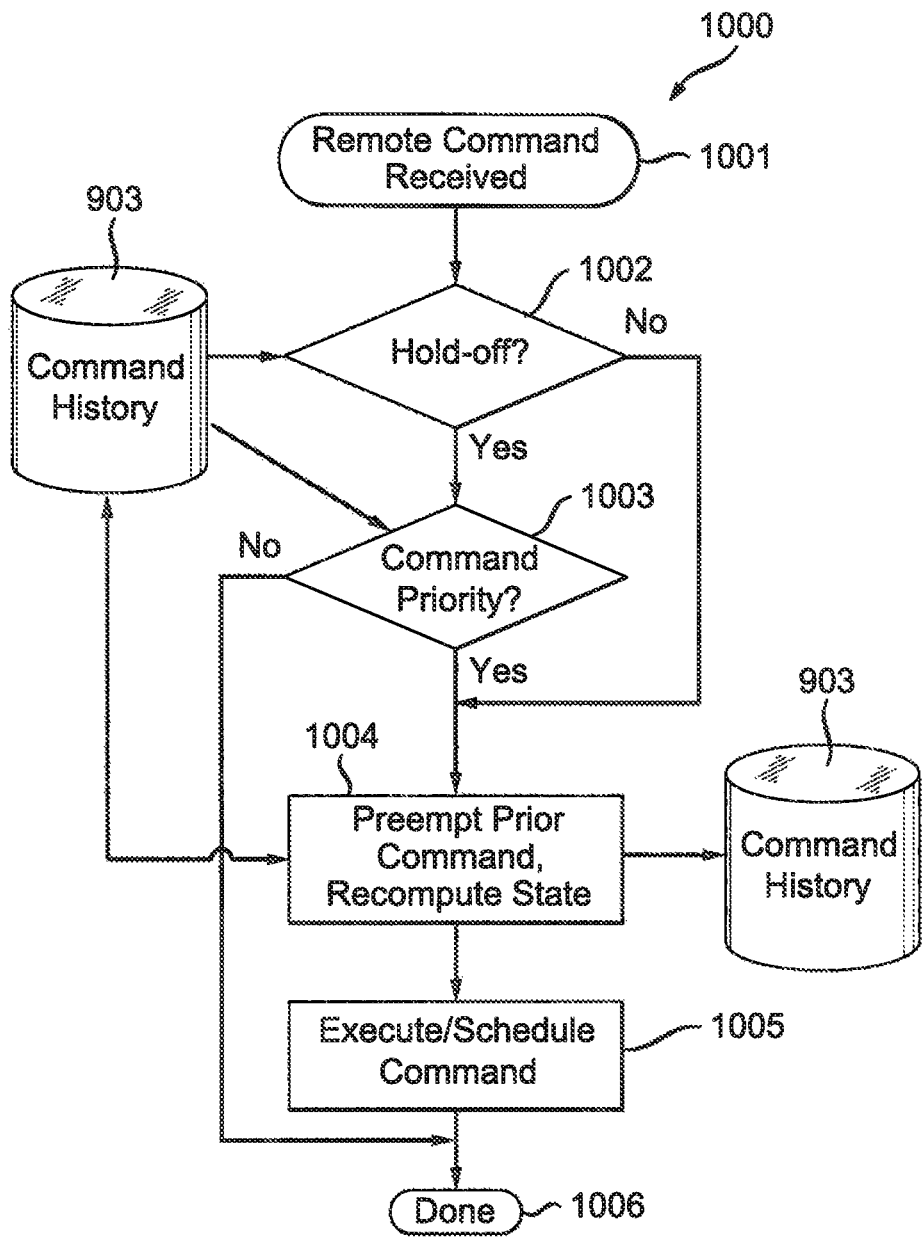
FIG. 10 depicts, in flow chart form, a content controller process for controlling shared content responsive to a remote content controller command; and, FIGS. 11A-D depict different exemplary behaviors a local station in response respond to the exemplary transactions of FIG. 5D.

FIG. 10 shows a simplified remote command handling process 1000 for use in stations providing distributed content controller. The process 1000 commences at step 1001 upon receipt of a new remote command from one of the other stations participating in the distributed content controller. During step 1002, a check of command history buffer 903 occurs to determine whether any currently active hold-offs remain. If not, then the new command undergoes immediate execution at step 1005 (or is scheduled for execution at the appropriate time). The command history buffer 903 records the current local content controller status as the current priority command.

However, if during step 1002, an active hold-off active exists, then during step 1003, a check occurs to determine whether the new command has priority over the current priority command, using data from the command history buffer 903. If an active hold-off exists and the new command does not have priority over it, the STB will ignore the new command and the process terminates at step 1006. However, if the new command does have priority, then the STB pre-empts the previously-received-but-lower-priority command(s) during step 1004 and then computes a hypothetical content controller state to determine the content controller state had the preempted commands never existed. During step 1005, the STB executes the new command (or schedules it for execution, that is, one or more actions are provided to the local content controller, including timeout values as needed). The STB records the current content controller state, (which is the hypothetical content controller state, depending on any commands preempted at step 1004), in the command history buffer 903 as the current priority command. Upon scheduling the new command for execution during step 1005, the process concludes at step 1006.

FIGS. 11A-D show exemplary local content controller behaviors for STBs 111, 121, 131 in reaction to the transactions shown in FIG. 5B. As discussed hereinafter, the behavior of the STB 131 differs for the different exemplary strategies in each of FIGS. 11A-D. In each of these four figures, the vertical content position axis 1101 has earlier content (in the sense of the content's own timeline) appearing near the bottom of the axis, and later content toward the top. The horizontal time axis 1102 progresses (from earlier to later) from left to right. As such, normal speed playout would be represented by a line having a slope of unity. The time values depicted in FIG. 5B ($t_{PRIOR}$ 553, $t_{LATER}$ 563, $t_{FIRST}$ 569, $t_{SECOND}$ 559, $t_{SYNC}$ 555, and $t_S$ 565) appear along the time axis 1102, with some time values ($t_{FIRST}$ to $t_S$) having extension lines extending upward to better show alignment with status changes in the various content controllers. Particular content locations "P1" 1103, "P2" 1104, and "P3" 1105 appear along content axis 1101.

In each of FIGS. 11A-D, as in FIG. 5B, before time $t_{PRIOR}$ 553, all three STBs 111, 121, 131 play at regular speed, substantially in synchronization. The regular speed playout, in the graphical representation of FIGS. 11A-11D, corresponds to the segment 1110, having a slope of 1.0, and represents normal playout. Segment 1110 appears as a thick line, indicating that all three STBs follow that time/position relationship. However, at time $t_{PRIOR}$ 553, the STB 111 receives SK− command 552, which results in its local content controller executing a backwards skip 1111 in the content, the skip being of size "−d". As a result, immediately following the time $t_{PRIOR}$ 553, the STB 111 will play content according to segment 1112. The segment 1112 indicates that, due to the skip backwards, content playout by the STB 111 is behind the playout of content by the STBs 121 and 131, which continue playing content (as represented by the segment 1113), by an amount of about "d" (measured in the units of content axis 1101, which could be in frames or time code units). Note that segment 1113 appears of medium thickness, representing content playout of the two STBs, whereas segment 1112 appears of minimum thickness, representing the playout of a single STB at that time/position relationship.

At the time $t_{LATER}$ 563, the STB 121 receives SK+ command 572 and skips forward through the content by the amount "+d" as show by forward skip 1114. As a result, each of STBs 111, 121, 131 are playing at different locations in the content at times just after the time $t_{LATER}$ 563, as shown by the thin segments 1112, 1115, and 1116, respectively. Some time before the time $t_{FIRST}$, the STB 121 receives the command message 573 from the STB 111, and responds with the jump 1117 (of approximate size −2d), responsive to the original SK− 552 command having obtained a higher priority by virtue of being earlier in time. As a result, the STB 111 and 121 play in synchronism as shown by the medium thickness segment 1118, with the STB 121 having abandoned its prior playout, represented by the trajectory along the segment 1119. Note that the details of the calculation needed by the STB 121 to determine the size of jump 1117 do not appear here, but such details will appear below in conjunction with each of the exemplary behaviors of the STB 131.

At the time $t_{FIRST}$ 569, the STB 131 receives the command message 575 from the STB 121, which resulted from SK+ command 572. In accordance with the exemplary processes shown in FIGS. 9 and 10, the STB 131 logs the current time ($t_{FIRST}$ 569), the position ("P3" 1105), and the speed ("1×", the slope of prior time/position segment 1116), which collectively represent local content controller status 1120, in the local command history buffer 903. From this point on, the exemplary behaviors of the STB 131 govern the rest of the graph, and will differ in each of FIGS. 11A-D.

Figure 11A:
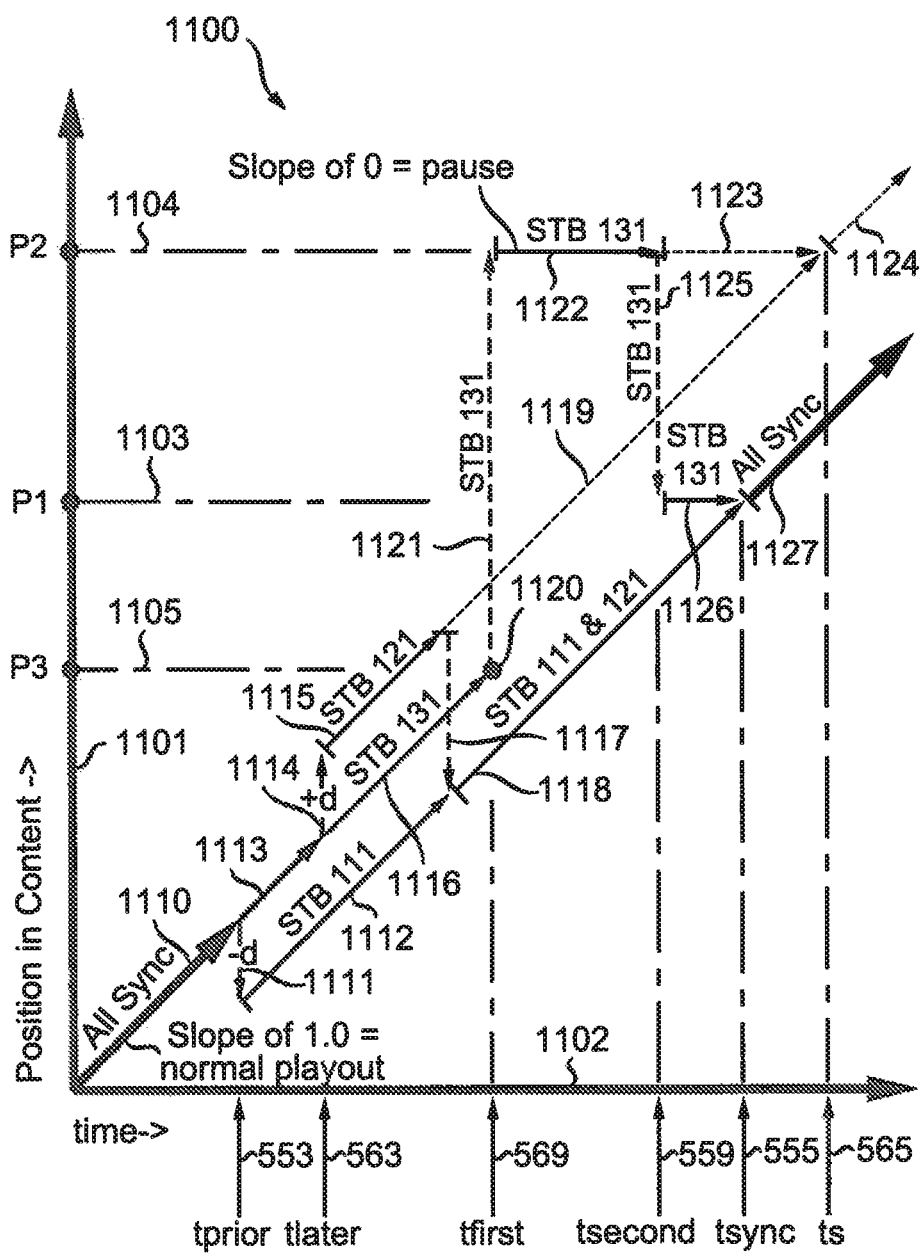

In FIG. 11A, when the STB 131 behaves in an exemplary manner, the STB 131 will immediately jump to an expected synchronization point, and wait there until the expected synchronization time, and thereafter play at the expected play rate. This behavior corresponds to the "pause" behavior depicted in FIG. 6 (though FIG. 6 is based on the transactions of FIG. 5A). From the message 572, the STB 131 computes a synchronization time by adding a predetermined interval 554 to the command time $t_{LATER}$ 563, to obtain the time $t_S$ 565. In the exemplary transaction of FIG. 5A, the message 572 explicitly provided the synchronization time. One method for computing the expected synchronization point is to extrapolate back from local content controller status point 1120 to determine the content controller position at time $t_{LATER}$, then add the default SK+ size (+d) to compute a new position, then extrapolate that position forward to time $t_S$, to obtain content position "P2" 1104. This particular method works well even if the commands or content controller status involves speeds other than 1× (e.g., as with fast-forward or rewind commands).

Thus, at time $t_{FIRST}$, the local content controller of STB 131 jumps as shown by the segment 1121 from "P3," the current position, to "P2," the expected synchronization point, and the pauses, as shown by segment 1122, which has a slope of zero, indicating that as time progresses, the content position does not. At this time, the STB 131 expects to remain paused (through segment 1123, until time $t_S$). Thereafter, the STB 131 expects to playout, as shown by segment 1124 having a slope of 1 and being collinear with segment 1115, which would have placed the STB 131 in synchronization with STB 121, had STB 121 continued playing without the jump 1117.

However, the STB 131 never gets to segments 1123 and 1124, because at the time $t_{SECOND}$ 559, the STB 131 receives SK− command message 574 from STB 111. This command takes priority over the command history entry associated with the status 1120. As a result, the STB 131 computes its local content controller position at time $t_{PRIOR}$ 553 (as given in the message 574), then offsets this position by "−d", and thereafter extrapolates forward to the expected synchronization time $t_{SYNC}$ 555, to determine expected synchronization point "P1" 1103. Thus, at the time $t_{SECOND}$, the STB 131 jumps to "P1," as shown by segment 1125, and waits, as shown by segment 1126, with the expectation that at the time $t_{SYNC}$, the STB will begin playout at normal speed along segment 1127. Since no other priority commands will preempt this action, that is exactly what happens, such that following $t_{SYNC}$ 555, all three stations again play in synchronism.

Note that, by virtue of the command history buffer 903, the STB 131, which extrapolates the expected synchronization position and expected synchronization time need only use the earliest log entry inferior to the newest priority command (i.e., the log entry having a lower priority, which usually means a later priority time). When the command history buffer 903 has no entries, as allowably occurs not later than when the most recent hold off interval has expired, then the STB makes use of the current local content controller status, since in that situation, all content controller expect to synchronize.

Though the jumps 1121 and 1125 appear to take zero time (or effectively one frame of time), that condition may not actually occur except when the content associated with those points already exists in a local buffer. The behavior of STB 131 in FIG. 11A will readily suit systems where the time necessary to jump to a new position is relatively long, or not reliably predicted. Thus, even if the segments 1121, 1125 each had a slope indicating that jumps take non-zero time, the same outcome would result even if though the individually paused segments 1122, 1126 were shorter. If the STB 131 blanked the picture during these pauses, then local participant 133 would not perceive a difference.

Figure 11B:
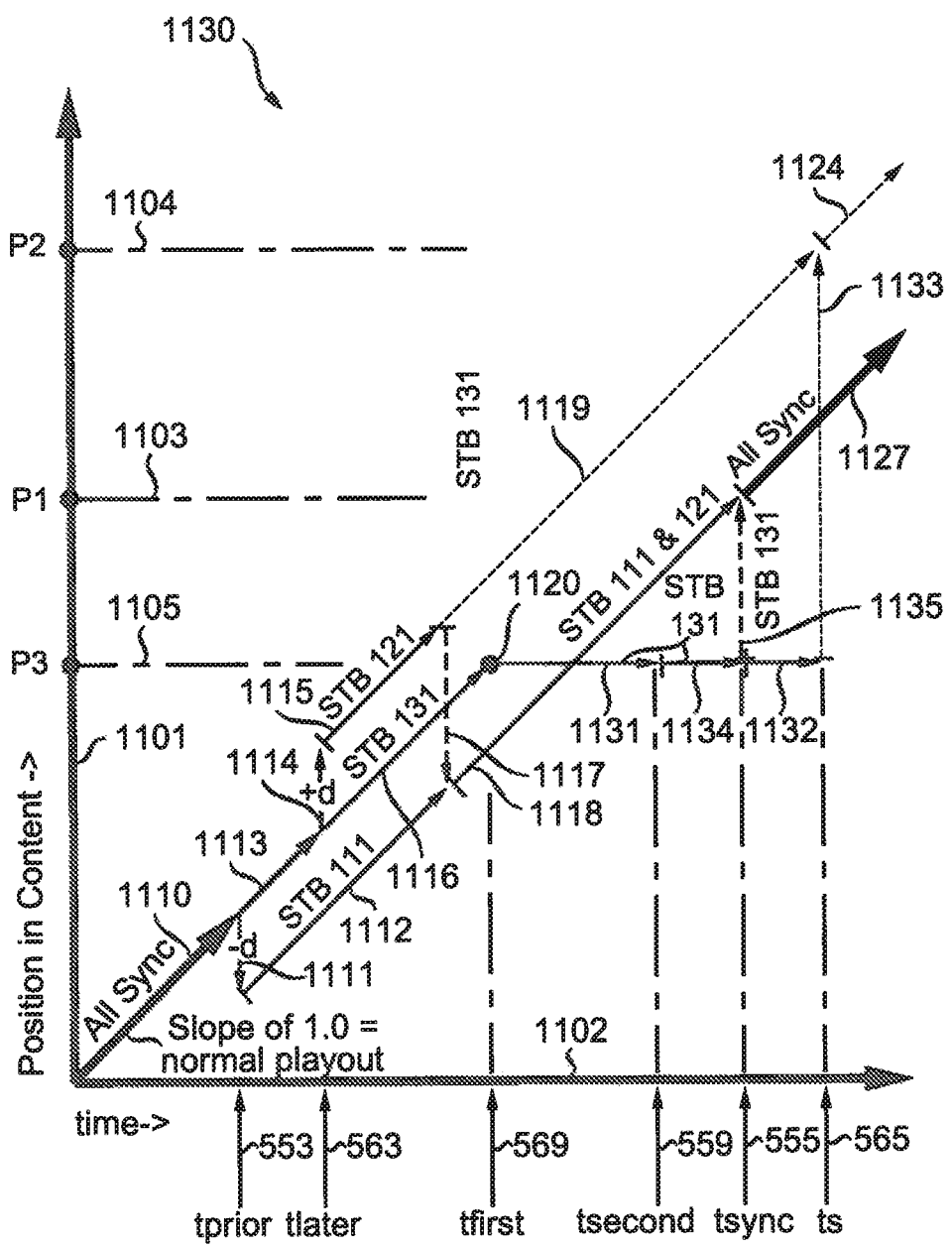

In FIG. 11B, the exemplary behavior of STB 131 differs because the STB immediately pauses and awaits the expected synchronization time. At the expected synchronization time, the STB 131 will jump to the expected synchronization point and begin playout from there. Thus, at time $t_{FIRST}$, the STB 131 computes expected synchronization time $t_S$ and position "P3" as before, and the local content controller immediately pauses, as shown by the segment 1131. The STB 131 would expect to remain paused through segments 1134, 1132, and then make the jump 1133 to "P2" and from there play along the segment 1124 (collinear with the segment 1115). However, the STB 131 does not follow the segments 1132, 1133, and 1124. Instead, at the time $t_{SECOND}$, the STB 131 computes a new expected synchronization time $t_{SYNC}$, and position "P1," again as above. As a result, the local content controller remains paused (segment 1134) only until the expected synchronization time $t_{SYNC}$, at which time the local content controller jumps (segment 1135) to the expected synchronization position "P1" and begins to regular playout of content (segment 1127) in synchronism with the STBs 111 and 121.

The behavior of STB 131 in FIG. 11B serves to minimize picture changes that might confuse the participant 133 by first jumping to a future event at "P2", then back to "P1." Instead, the STB 131 only shows the final priority command result, starting from "P1." If the STB 131 blanked the image during the pauses 1131 and 1134, then the participant 133 would not notice a difference (barring a change in attribution of the command, as from 755 to 764). The present behavior also offers an opportunity to reduce bandwidth consumption where delivery being quick (i.e., the jumps require little time) and predictable, since under such conditions the fetching of content need not occur until just before the expected synchronization time. This makes it possible for STB 131 to avoid a needless content fetch for "P2" in response to the message 575 right after the time $t_{FIRST}$, since that skip forward will undergo pre-emption at the time $t_{SECOND}$.

Figure 11C:
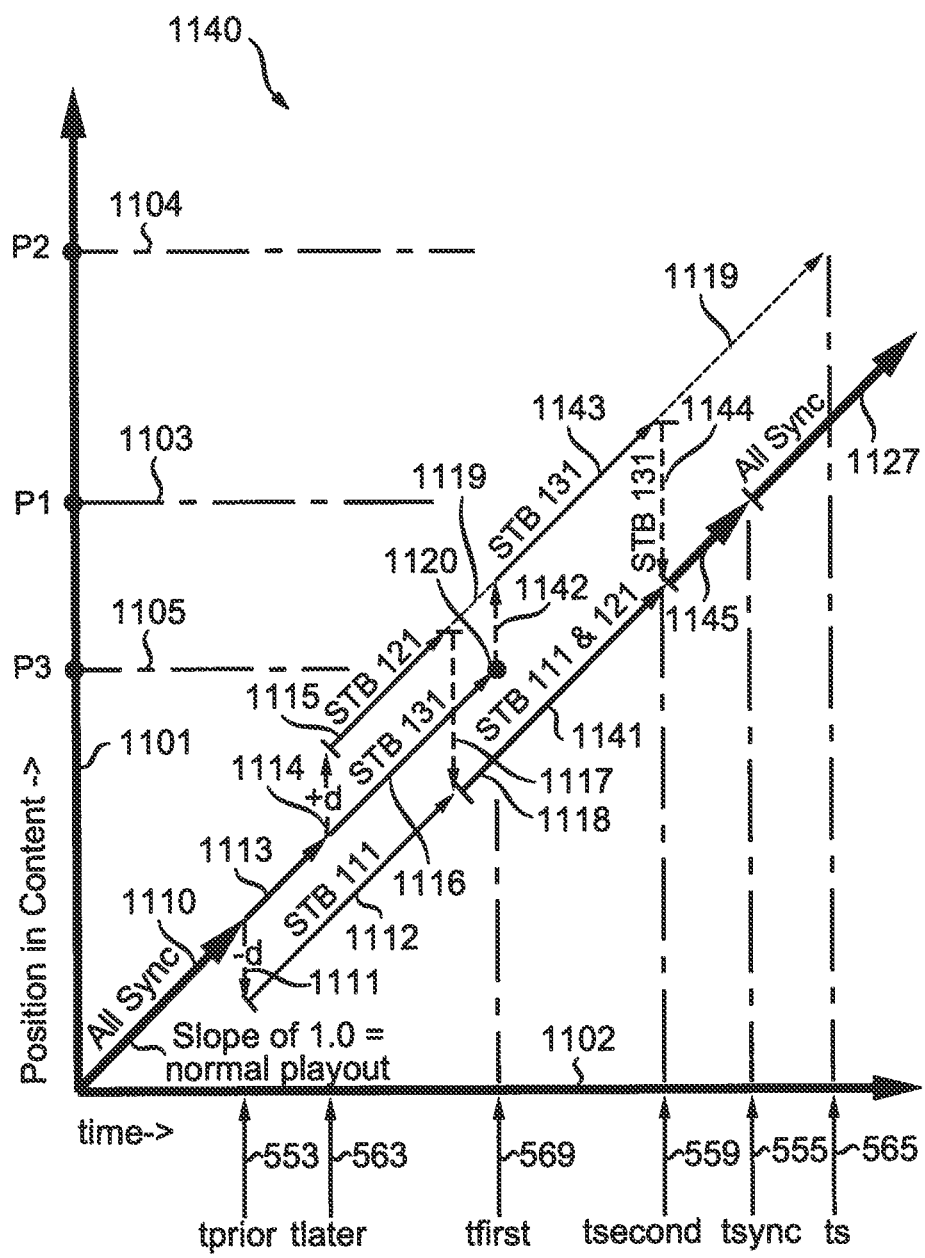

In FIG. 11C, the exemplary behavior of the STB 131 matches that of the STB 121 in all of FIGS. 11A-D. In FIG. 11C, the STB 131 immediately jumps to the expected current position and begins playout. This activity constitutes the "pre-roll" behavior shown in FIG. 7 (though FIG. 7 depends on the transactions depicted in FIG. 5A). Here, at time $t_{FIRST}$, because of SK+ command message 575, the STB 131 computes the current position of STB 121 by first extrapolating back the position at time $t_{LATER}$, then adding offset "+d", and thereafter extrapolating forward to the time $t_{FIRST}$. The local content controller immediately jumps, as indicated by the segment 1142 to that point and begins playout, as indicated by the segment 1143 (collinear with segment 1115), until receipt of the SK− command message 574 at the time $t_{SECOND}$. At the time $t_{SECOND}$, the STB 131 computes the content position of the STB 111 by extrapolating back its own content position, as represented by the record 1120 stored in command history 903, to the time $t_{PRIOR}$. The STB 131 adds offset "−d" to that position in accordance with the new priority command, then extrapolates forward to determine the position at the current time and make a corresponding jump, as represented by the segment 1144, to begin immediate playout as represented by segment 1145, collinear and in synchronization with STBs 111 and 121, even before segment 1127. This behavior affords the advantage of pausing the screen for a minimum amount of time, and synchronization with the station issuing the highest priority command occurs as soon as possible.

Figure 11D:
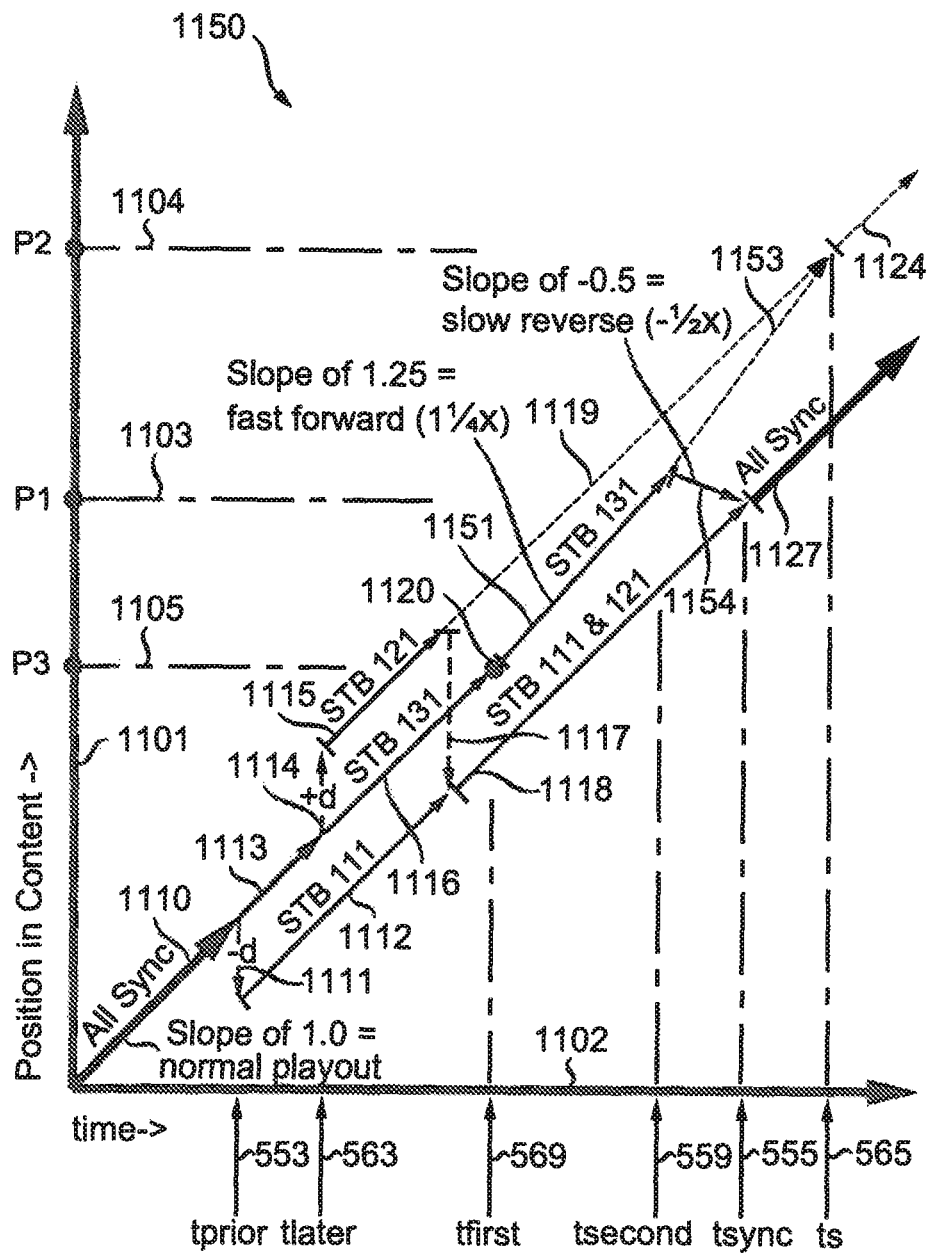

FIG. 11D shows exemplary behaviors of the STB 131, shown less for its usefulness and more to illustrate a broad range of diverse possibilities. The behavior here requires an ability of the local content controller to play at an arbitrary speed. Thus, at $t_{FIRST}$, when the computation of expected synchronization position "P2" at expected synchronization time "$t_S$" occurs, the slope to that time/position pair is determined from the current time/position pair at the segment 1120, which in this example is 1.25. In response to this calculation, the local content controller immediately begins to play at a speed of 1¼× as shown by segment 1151 with the expectation of reaching "P2" at "tS" and playing at normal speed thereafter, as represented by the segment 1124. However, this fast forward playout is preempted at $t_{SECOND}$ (so the segment 1153 isn't played), and the STB 131 computes the slope from its local content controller's current position to the expected synchronization point "P1" at $t_{SYNC}$, which results in a slope of −0.5. Thus, at $t_{SECOND}$, STB begins to rewind at a slow speed of −0.5×, as shown by segment 1154, until $t_{SYNC}$, after which playout is forward again, at normal speed, in synchronization with STBs 111, 121 as shown in segment 1127.

Even if the local content controller provided by the STB 131 cannot achieve play out at arbitrary speeds, for example, due to constraint of the fast-forward or rewind speeds to integer values, the STB could still achieve this behavior by using piecewise achievable rates. For example, the STB could approximate the slope of 1.25 for segment 1120 by planning to first fast-forward at 2× and then drop to 1× after intersecting the segment 1119. Similarly, the STB 131 could approximate the slope if −0.5 of segment 1154 by rewinding at 1× until reaching "P1", then pausing until $t_{SYNC}$, or in the alternative, rewinding at 1× until intersecting with segment 1118, and then playing forward at normal speed straight through $t_{SYNC}$ and "P1".

This behavior for STB 131 has the advantage of reducing the number of icons required to understand what the remote participants have commanded. For example, no need exists to indicate a backwards skip if the video visibly runs backwards to that point. The attribution element of such icons (e.g., 654, 655, 664) can still be provided to indicate who issues the commands. In each of these behaviors, skips forward, or changes in playout rate or direction can take time due to various sources of latency. Multiple ways exist to handle these issues to restore synchronization. One way would be to measure the latency experienced in the performance of each command. If the plan was to skip to a location and begin play, and that was to occur instantly, but actually took 100 mS, then the next command (whenever it occurs) might be told that its target position is 100 mS later. In this way, the synchronism is never worse than the worst latency, and is likely less, since each station will experience latencies of its own, and these will tend to cancel at least a portion of each other. Another way would be to estimate the latency for each command. For example, it might be known that a short skip forward (and perhaps a larger skip backwards) will have zero latency (since content might already undergo buffering) or a tiny latency (for example related to flushing and refilling a video decoder pipeline). A larger skip in either direction could have a different, large latency (related to fetching content that had not already undergone buffering or for which the buffer has been flushed), in which case the commanded position can be offset by the expected latency, in the direction of play. That is, if the skip to a new location should be followed by backwards playout at a speed −2×, then target position should become offset by −2 times the expected latency in the skip. In this way, the local synchronization error will be merely the magnitude of any misestimation, rather than the entirety of the expected latency.

A third way would combine these methods, using previous experiences and current network latencies to estimate the offset for each command, and then add in the measured misestimating to the next command, whenever it arrives. A fourth method makes use of micro jumps or tiny variations in playout speed to reduce the measured synchronization error. For example, in the local STB, a frame might be skipped or the playback speed adjusted+/−1% until the adequate synchronization is restored. During such speed adjustments, adjustment of the corresponding audio pitch can occur so that voices and music do not change pitch, though they will still change tempo slightly.

If some catastrophic desynchronizing event occurs, e.g., one STB cannot access content for several seconds, several methods exist that enable the STB to recover. The hapless STB might issue a command with the effect of skipping backward to a point as far before the loss of content as the amount of time expected for content restoration to occur. Thus, if the STB expects that content will take 10 seconds to recover, a backwards ship of 10 seconds, which may be attributed to the suffering STB, would allow time to re-request and re-acquire the missing content, and playout would occur cleanly, barring the momentary rewind. This choice might prove preferable to pausing playout on all systems with a "rebuffering" icon attributed to the STB losing signal, since a 10-second break in playout might be perceived as more disruptive than a 10-second skip backwards. Alternatively, the STB that loses content might pause until restoration of content and then play at an exaggerated speed (e.g., +5%) to catch up more quickly. Again, the corresponding audio can undergo compensation.

Another embodiment of the present invention would allow for a separate teleconference system (not shown) to provide telepresence monitors & cameras. Corresponding DVD players (not shown) that incorporate the distributed content controller mechanisms and processes described herein could replace the STBs 111, 121 and 131. Each such DVD player could have a copy of the same DVD. To facilitate some of the content controller operations, such a player could have additional digital buffering to facilitate synchronization.

In some embodiments, the content shared among the stations could include interactive elements, including graphical user interface elements such menus, checkboxes, and buttons, and additional commands such as load (or select) content, eject, etc. The sharing of these user interface elements need not strictly require extension or modification to the distributed content controller, as might be accomplished by adding commands and states to state diagram 200 and commands, states, and actions to state transition table 300. However, the principles of the command history, command priorities, hold-offs, and unwinding previously executed but lower priority commands remain applicable.

In the opposite extreme, in other embodiments, the master station could select what content should play on shared monitors 112, 122, and 132 (e.g., using a user interface). Once selected, each station, or just head-end 102, receives information as to what content the stations will share, and no extension to the state diagram 200 or transition table 300 becomes necessary to provide participants 113, 123, 133 with the experience of sharing content with a distributed content controller.

The foregoing describes a technique for providing shared content among a plurality of stations using a distributed content controller.

The invention claimed is:

1. A method, to be performed at a local content controller, comprising:
   prioritizing a received transport command with yet unexecuted transport commands by taking account of an issuing time of said received transport command and issuing times of said yet unexecuted transport commands, said received transport command and said yet unexecuted transport commands being adapted to control a playback of a content shared by said local content controller and at least one remote content controller;
   when said received transport command has been issued by the local content controller and has priority on said yet unexecuted transport commands, transmitting the received transport command to said at least one remote content controller;
   executing the prioritized transport commands in accordance with a latency between said local and/or remote content controllers; and
   during a hold-off interval after an issued command, delaying execution of a transport command issued by one of said remote content controllers in case it has priority, and ignoring the transport command issued by one of said remote content controllers in case it does not have priority.

2. The method according to claim 1 wherein the latency between said content controllers is determined in accordance with a round-trip time for a signal to travel one of said local and/or said remote controllers to and from another of said local and/or said remote controllers.

3. The method according to claim 1 wherein the yet unexecuted commands include at least one transport command issued by said local content controller.

4. The method according to claim 1 wherein the yet unexecuted commands include at least one transport command issued by at least one of said remote content controller.

5. The method of claim 1 wherein the transport commands issued by said local controller and transport commands issued by at least one of said remote content controllers include a respective timestamp indicating their issuing time.

6. A method, to be performed at a local content controller comprising:
   determining whether a first transport command received at the local content controller has priority with respect to a previously received second transport command, said first and second transport commands being adapted to control a playback of a content shared by said local controller and by at least one remote controller, said determining taking account of issuing times of said first and second transport command;
   when the first transport command has priority, executing the first transport command at the local content controller; but when the second transport command has priority, not executing the first transport command at the local content controller; and
   during a hold-off interval after an issued command, delaying execution of a transport command issued by said at least one remote content controller in case it has priority, and ignoring the transport command issued by said at least one emote content controller in case it does not have priority.

7. The method of claim 6, wherein when the first transport command is issued by said local content controller, the method comprises transmitting the first transport command to said at least one remote content controller.

8. The method of claim 6, wherein the priority of the first transport command is determined in accordance with which of a plurality of content controllers issued the first transport command.

9. The method of claim 6 wherein the first and second transport commands each include a respective timestamp indicating their issuing time.

10. The method of claim 6, wherein:
    i) if the first command issued before the second command, the first command has priority;
    ii) if the first command did not issue before the second command and the first and second commands are issued by the same content controller, the first command has priority;
    iii) if the first command issued after the second command by at least a first amount of time and the first and second commands are issued by different content controllers, the first command has priority;
    iv) if the first command issued after the second command by less than a first time value and the first and second commands are issued by different content controllers, the first command does not have priority, v) if the first command issued at the same time as the second command, determining whether the first transport command has priority based other than when the first and second transport commands were issued.

11. The method of claim 6 wherein i) if the first command issued before the second command by less than a time value, the execution of the first command overrides a previous execution of the second command; and, ii) otherwise the execution of the first command does not override the previous execution of the second command.

* * * * *